United States Patent
Li et al.

(10) Patent No.: US 11,558,102 B2
(45) Date of Patent: Jan. 17, 2023

(54) TECHNIQUES TO USE REFERENCE SIGNALS FOR INTELLIGENT REFLECTING SURFACE SYSTEMS

(71) Applicant: QUALCOMM Incorporated, San Diego, CA (US)

(72) Inventors: Junyi Li, Fairless Hills, PA (US); Qiang Wu, San Diego, CA (US); Ozge Koymen, Princeton, NJ (US); Raju Hormis, New York, NY (US); Farideddin Fayazbakhsh, Chatham, NJ (US); Mehmet Izzet Gurelli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/468,036

(22) Filed: Sep. 7, 2021

(65) Prior Publication Data

US 2022/0077919 A1  Mar. 10, 2022

Related U.S. Application Data

(60) Provisional application No. 63/076,764, filed on Sep. 10, 2020.

(51) Int. Cl.
*H04B 7/0413* (2017.01)
*H04B 7/145* (2006.01)
*H04L 5/00* (2006.01)

(52) U.S. Cl.
CPC ........... *H04B 7/145* (2013.01); *H04B 7/0413* (2013.01); *H04L 5/0048* (2013.01)

(58) Field of Classification Search
CPC ...... H04B 7/145; H04B 7/0413; H04L 5/0048
See application file for complete search history.

(56) References Cited

U.S. PATENT DOCUMENTS

2022/0014935 A1* 1/2022 Haija .................. H04B 17/336

OTHER PUBLICATIONS

Tao et al. "Intelligence Reflecting Surface Aided Multicasting with Random Passive Beamforming". Sep. 2020; Cornell University Library; pp. 1-6 (Year: 2020).*

(Continued)

*Primary Examiner* — Rahel Guarino
(74) *Attorney, Agent, or Firm* — Dalei Dong; Holland & Hart LLP

(57) ABSTRACT

Methods, systems, and devices for wireless communications are described. A base station may identify an intelligent reflecting surface device for communications with a user equipment. The base station may determine a reference signal configuration based on the identified intelligent reflecting surface device. The reference signal configuration may include a first set of parameters associated with the intelligent reflecting surface device. The base station may transmit, to the UE, the intelligent reflecting surface device, or both, one or more reference signals in accordance with the first set of parameters. The base station may identify a second set of parameters associated with one or more reflecting elements of the intelligent reflecting surface device.

30 Claims, 18 Drawing Sheets

(56) References Cited

OTHER PUBLICATIONS

Araujo G., et al., "Channel Estimation for Intelligent Reflecting Surface Assisted MIMO Systems: A Tensor Modeling Approach", arxiv.org, Cornell University Library, 201 Olin Library Cornell University Ithaca, NY 14853, Aug. 10, 2020 (Aug. 10, 2020), pp. 1-13, XP081738315, Sections III-VI, Figures 1-2.
International Search Report and Written Opinion—PCT/US2021/049384—ISA/EPO—dated Dec. 23, 2021.
Tao Q., et al., "Intelligent Reflecting Surface Aided Multicasting with Random Passive Beamforming", arxiv.org, Cornell University Library, 201 Olin Library Cornell University Ithaca, NY 14853, Sep. 1, 2020 (Sep. 1, 2020), pp. 1-6, XP081753190, Abstract, Sections I, II, IV, figures 1-2.
Yang Y., et al., "Intelligent Reflecting Surface Meets OFDM: Protocol Design and Rate Maximization", arxiv.org, Cornell University Library, 201 Olin Library Cornell University Ithaca, NY 14853, Jun. 21, 2019 (Jun. 21, 2019), pp. 1-30, XP081383557, Sections I-III, figures 1-3.

\* cited by examiner

TECHNIQUES TO USE REFERENCE SIGNALS FOR INTELLIGENT REFLECTING SURFACE SYSTEMS

CROSS REFERENCE

The present Application for Patent claims the benefit of U.S. Provisional Patent Application No. 63/076,764 by LI et al., entitled "TECHNIQUES TO USE REFERENCE SIGNALS FOR INTELLIGENT REFLECTING SURFACE SYSTEMS," filed Sep. 10, 2020, assigned to the assignee hereof, which is hereby incorporated by reference in its entirety.

FIELD OF DISCLOSURE

The following relates to wireless communications, including techniques to use reference signals for intelligent reflecting surface systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Some wireless communications system may support reference signaling, which may enable a base station or a UE to estimate channel conditions for communications. However, conventional techniques for reference signaling may be deficient, which may result in inefficient communications or relatively poor channel estimation.

SUMMARY

The described techniques relate to improved methods, systems, devices, and apparatuses that support techniques to use reference signals for intelligent reflecting surface (IRS) systems. The described techniques may enable devices in a wireless communications system to implement reference signaling using the one or more IRS devices, which may enable efficient communications and enhanced channel estimation (e.g., estimation of the paths between a base station and a user equipment (UE), estimation of the paths between the base station and the UE via relaying signals by an IRS device, or a combination thereof), among other advantages. For example, the wireless communications system may support communications between a base station and a UE (e.g., multiple input multiple output (MIMO) communications) using an IRS device. The base station, the UE, the IRS device, or a combination thereof may determine a reference signal configuration. For example, the base station may determine a reference signal configuration including a first set of parameters for communication of one or more reference signals. The first set of parameters may indicate a quantity of reference signals, a transmission order of the reference signals, resources for the reference signals, or any combination thereof, among other examples of parameters.

The base station may transmit the one or more reference signals to the UE in accordance with the first set of parameters of the reference signal configuration. For example, the base station may transmit a quantity of reference signals that supports channel estimation via a signal path using the IRS device and via a signal path that does not use the IRS device. As an illustrative example, the IRS device may relay one or more reference signals to the UE in accordance with the configuration (e.g., the IRS device may reflect the one or more reference signals to the UE). The UE may receive the reference signals and indicate the received reference signals to the base station (e.g., the UE may transmit feedback for the reference signals to the base station). The base station may estimate the channel conditions (e.g., channel state information) based on the received indication. For example, the base station may estimate channel conditions for communicating with the UE via the IRS and channel conditions for communicating with the UE without the IRS. In some examples, the base station may determine a second set of parameters for one or more reflecting elements of the IRS device based on the estimated channel conditions (e.g., the base station may determine a reflection coefficient for each reflecting element of the IRS). The base station may indicate the second set of parameters to the IRS device. Such techniques may enable the base station to communicate with the UE via the IRS relatively efficiently, which may improve reliability and coverage in the system, among other advantages.

A method of wireless communications at a base station is described. The method may include identifying an IRS device for communications with a UE, determining a reference signal configuration based on the identified IRS device, the reference signal configuration including a first set of parameters associated with the IRS device, transmitting one or more reference signals in accordance with the first set of parameters of the reference signal configuration, and identifying a second set of parameters associated with one or more reflecting elements of the IRS device.

An apparatus for wireless communications at a base station is described. The apparatus may include a processor, memory coupled with the processor, and instructions stored in the memory. The instructions may be executable by the processor to cause the apparatus to identify an IRS device for communications with a UE, determine a reference signal configuration based on the identified IRS device, the reference signal configuration including a first set of parameters associated with the IRS device, transmit one or more reference signals in accordance with the first set of parameters of the reference signal configuration, and identify a second set of parameters associated with one or more reflecting elements of the IRS device.

Another apparatus for wireless communications at a base station is described. The apparatus may include means for identifying an IRS device for communications with a UE, determining a reference signal configuration based on the identified IRS device, the reference signal configuration including a first set of parameters associated with the IRS device, transmitting one or more reference signals in accordance with the first set of parameters of the reference signal configuration, and identifying a second set of parameters associated with one or more reflecting elements of the IRS device.

A non-transitory computer-readable medium storing code for wireless communications at a base station is described. The code may include instructions executable by a processor to identify an IRS device for communications with a UE, determine a reference signal configuration based on the identified IRS device, the reference signal configuration including a first set of parameters associated with the IRS device, transmit one or more reference signals in accordance with the first set of parameters of the reference signal configuration, and identify a second set of parameters associated with one or more reflecting elements of the IRS device.

Some examples of the method, apparatuses, and non-transitory computer-readable medium described herein may further include operations, features, means, or instructions for identifying a quantity of the one or more reference signals based on the identified IRS device.

Some examples of the method, apparatuses, and non-transitory computer-readable medium described herein may further include operations, features, means, or instructions for identifying a first portion of the quantity of the one or more reference signals and a second portion of the quantity of the one or more reference signals.

In some examples of the method, apparatuses, and non-transitory computer-readable medium described herein, the first portion corresponds to a quantity of layers of MIMO communications with the UE and the second portion corresponds to a quantity of the one or more reflecting elements of the IRS device.

In some examples of the method, apparatuses, and non-transitory computer-readable medium described herein, the first portion includes a first set of reference signals associated with a first parameter of the first set of parameters, and where the second portion includes a second set of reference signals associated with the first set of parameters.

Some examples of the method, apparatuses, and non-transitory computer-readable medium described herein may further include operations, features, means, or instructions for identifying a transmission order of the quantity of the one or more reference signals, where transmitting the one or more reference signals includes transmitting the one or more reference signals in accordance with the identified transmission order.

In some examples of the method, apparatuses, and non-transitory computer-readable medium described herein, the reference signal configuration indicates the transmission order.

Some examples of the method, apparatuses, and non-transitory computer-readable medium described herein may further include operations, features, means, or instructions for transmitting, to the IRS device, an indication of the identified second set of parameters.

Some examples of the method, apparatuses, and non-transitory computer-readable medium described herein may further include operations, features, means, or instructions for receiving, from the UE, an indication of the IRS device, where identifying the IRS device may be based on the received indication.

Some examples of the method, apparatuses, and non-transitory computer-readable medium described herein may further include operations, features, means, or instructions for receiving, from the UE in response to transmitting the one or more reference signals, feedback for the one or more reference signals, and estimating channel state information based on the received feedback.

Some examples of the method, apparatuses, and non-transitory computer-readable medium described herein may further include operations, features, means, or instructions for identifying the second set of parameters may be based on the estimated channel state information.

Some examples of the method, apparatuses, and non-transitory computer-readable medium described herein may further include operations, features, means, or instructions for communicating with the UE using the IRS device in accordance with the second set of parameters associated with the one or more reflecting elements and a third set of parameters associated with one or more antennas of the UE, where the communications include a MIMO data transmission.

Some examples of the method, apparatuses, and non-transitory computer-readable medium described herein may further include operations, features, means, or instructions for transmitting, to at least one of the UE, the IRS device, or a combination thereof, the reference signal configuration.

A method of wireless communications at an IRS device is described. The method may include receiving one or more reference signals from a base station in accordance with a reference signal configuration for communications between the base station and a UE, the reference signal configuration indicating a first set of parameters associated with one or more reflecting elements of the IRS device, relaying the one or more reference signals from the base station in accordance with the first set of parameters of the reference signal configuration, and relaying the communications between the base station and the UE in accordance with a second set of parameters associated with the one or more reflecting elements of the IRS device based on relaying the one or more reference signals.

An apparatus for wireless communications at an IRS device is described. The apparatus may include a processor, memory coupled with the processor, and instructions stored in the memory. The instructions may be executable by the processor to cause the apparatus to receive one or more reference signals from a base station in accordance with a reference signal configuration for communications between the base station and a UE, the reference signal configuration indicating a first set of parameters associated with one or more reflecting elements of the IRS device, relay the one or more reference signals from the base station in accordance with the first set of parameters of the reference signal configuration, and relay communications between the base station and the UE in accordance with a second set of parameters associated with the one or more reflecting elements of the IRS device based on relaying the one or more reference signals.

Another apparatus for wireless communications at an IRS device is described. The apparatus may include means for receiving one or more reference signals from a base station in accordance with a reference signal configuration for communications between the base station and a UE, the reference signal configuration indicating a first set of parameters associated with one or more reflecting elements of the IRS device, relaying the one or more reference signals from the base station in accordance with the first set of parameters of the reference signal configuration, and relaying the communications between the base station and the UE in accordance with a second set of parameters associated with the one or more reflecting elements of the IRS device based on relaying the one or more reference signals.

A non-transitory computer-readable medium storing code for wireless communications at an IRS device is described. The code may include instructions executable by a processor to receive one or more reference signals from a base station in accordance with a reference signal configuration for communications between the base station and a UE, the reference signal configuration indicating a first set of parameters associated with one or more reflecting elements of the IRS device, relay the one or more reference signals from the base station in accordance with the first set of parameters of the reference signal configuration, and relay communications between the base station and the UE in accordance with a second set of parameters associated with the one or more reflecting elements of the IRS device based on relaying the one or more reference signals.

Some examples of the method, apparatuses, and non-transitory computer-readable medium described herein may further include operations, features, means, or instructions for identifying the second set of parameters for relaying the communications between the base station and the UE.

Some examples of the method, apparatuses, and non-transitory computer-readable medium described herein may further include operations, features, means, or instructions for receiving, from the base station, an indication of the second set of parameters, where identifying the second set of parameters may be based on the received indication.

Some examples of the method, apparatuses, and non-transitory computer-readable medium described herein may further include operations, features, means, or instructions for identifying a quantity of the one or more reference signals based on the reference signal configuration.

Some examples of the method, apparatuses, and non-transitory computer-readable medium described herein may further include operations, features, means, or instructions for identifying a first portion of the quantity of the one or more reference signals and a second portion of the quantity of the one or more reference signals.

In some examples of the method, apparatuses, and non-transitory computer-readable medium described herein, the first portion corresponds to a quantity of layers of MIMO communications and the second portion corresponds to a quantity of the one or more reflecting elements of the IRS device.

In some examples of the method, apparatuses, and non-transitory computer-readable medium described herein, the first portion includes a first set of reference signals associated with a first parameter of the first set of parameters, and where the second portion includes a second set of reference signals associated with the first set of parameters.

Some examples of the method, apparatuses, and non-transitory computer-readable medium described herein may further include operations, features, means, or instructions for identifying a transmission order of the quantity of the one or more reference signals, where relaying the one or more reference signals includes relaying the one or more reference signals in accordance with the identified transmission order.

Some examples of the method, apparatuses, and non-transitory computer-readable medium described herein may further include operations, features, means, or instructions for adjusting the one or more reflecting elements of the IRS device in accordance with the second set of parameters, where relaying the communications includes relaying the communications using the adjusted one or more reflecting elements, where the communications include a MIMO data transmission.

Some examples of the method, apparatuses, and non-transitory computer-readable medium described herein may further include operations, features, means, or instructions for receiving, from the base station, an indication of the reference signal configuration.

A method of wireless communications at a UE is described. The method may include receiving one or more reference signals in accordance with a first set of parameters of a reference signal configuration, the first set of parameters associated with reception of one or more reference signals using an IRS device, transmitting, to at least one of a base station, the IRS device, or a combination thereof, channel status information based on the received one or more reference signals, and communicating with the base station using the IRS device based on the channel status information.

An apparatus for wireless communications at a UE is described. The apparatus may include a processor, memory coupled with the processor, and instructions stored in the memory. The instructions may be executable by the processor to cause the apparatus to receive one or more reference signals in accordance with a first set of parameters of a reference signal configuration, the first set of parameters associated with reception of one or more reference signals using an IRS device, transmit, to at least one of a base station, the IRS device, or a combination thereof, channel status information based on the received one or more reference signals, and communicate with the base station using the IRS device based on the channel status information.

Another apparatus for wireless communications at a UE is described. The apparatus may include means for receiving one or more reference signals in accordance with a first set of parameters of a reference signal configuration, the first set of parameters associated with reception of one or more reference signals using an IRS device, transmitting, to at least one of a base station, the IRS device, or a combination thereof, channel status information based on the received one or more reference signals, and communicating with the base station using the IRS device based on the channel status information.

A non-transitory computer-readable medium storing code for wireless communications at a UE is described. The code may include instructions executable by a processor to receive one or more reference signals in accordance with a first set of parameters of a reference signal configuration, the first set of parameters associated with reception of one or more reference signals using an IRS device, transmit, to at least one of a base station, the IRS device, or a combination thereof, channel status information based on the received one or more reference signals, and communicate with the base station using the IRS device based on the channel status information.

Some examples of the method, apparatuses, and non-transitory computer-readable medium described herein may further include operations, features, means, or instructions for identifying an IRS device for communications with the base station, and transmitting an indication of the identified IRS device to the base station.

Some examples of the method, apparatuses, and non-transitory computer-readable medium described herein may further include operations, features, means, or instructions for identifying a quantity of the one or more reference signals based on the received reference signal configuration.

Some examples of the method, apparatuses, and non-transitory computer-readable medium described herein may further include operations, features, means, or instructions for identifying a first portion of the quantity of the one or more reference signals and a second portion of the quantity of the one or more reference signals.

In some examples of the method, apparatuses, and non-transitory computer-readable medium described herein, the first portion corresponds to a quantity of layers of MIMO communications with the base station and the second portion corresponds to a quantity of the one or more reflecting elements of the IRS device.

In some examples of the method, apparatuses, and non-transitory computer-readable medium described herein, the first portion includes a first set of reference signals associated with a first parameter of the first set of parameters, and where the second portion includes a second set of reference signals associated with the first set of parameters.

Some examples of the method, apparatuses, and non-transitory computer-readable medium described herein may further include operations, features, means, or instructions for identifying a transmission order of the quantity of the one or more reference signals, where receiving the one or more reference signals includes receiving the one or more reference signals in accordance with the identified transmission order.

In some examples of the method, apparatuses, and non-transitory computer-readable medium described herein, the communicating with the base station includes receiving a MIMO data transmission.

DETAILED DESCRIPTION

Figure 1:
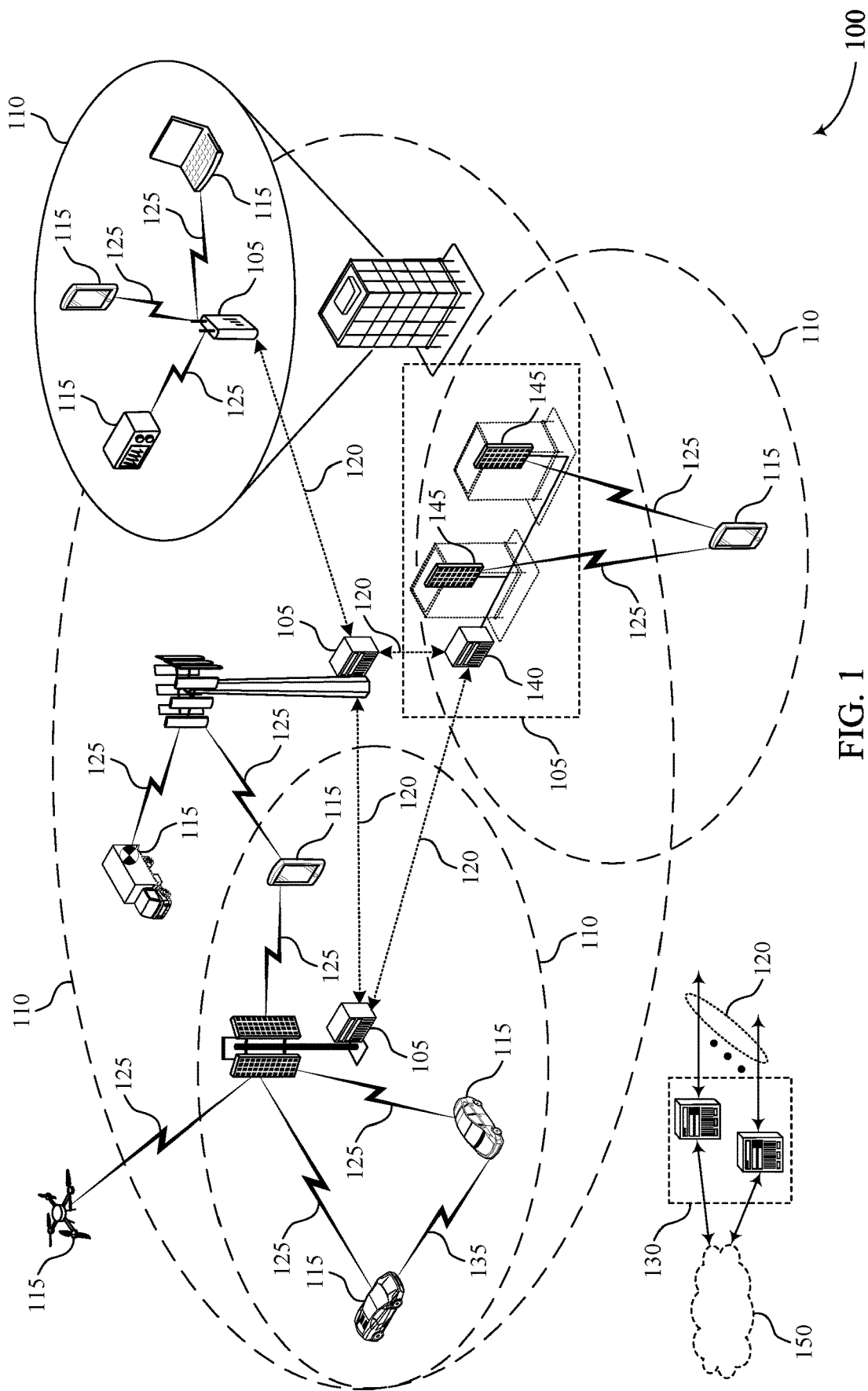
FIG. 1 illustrates an example of a system for wireless communications that supports techniques to use reference signals for intelligent reflecting surface systems in accordance with various aspects of the present disclosure.

Some wireless communications systems (e.g., 5G systems, 6G systems, etc.) may support communications between devices via an intelligent reflecting surface (IRS). For example, a base station may transmit signals to the IRS for forwarding (e.g., relaying) to a user equipment (UE), for example, in addition or alternative to transmitting signals directly to the UE. The IRS may redirect the signals to the UE such that the UE may reliably receive the signals from the base station (e.g., even when there is an obstruction in the path between the base station and the UE). In some examples, forwarding signals may include reflecting signals received from the base station to the UE and may be described as redirecting, relaying, or routing the signals. An IRS device may be an example of a surface capable of manipulating the propagation of electromagnetic waves (e.g., signals) in a programmable manner (e.g., reflecting elements of the IRS may be controllable). Such an IRS device may adjust reflecting elements of the surface to improve communications reliability and system performance. In some examples, the reflecting elements may be examples of passive elements (e.g., elements that do not use power to reflect the signals), such as reflective materials (e.g., metal materials, chemical materials, etc.), or the IRS device may use active elements to redirect signals. A device (e.g., an IRS device or a base station) may adjust the properties of such materials to realize different angles for the beam direction of signals. Such passive elements may reduce a power consumption of a system while enabling reliable signal reception for non-line of sight (NLOS) paths between a base station and a UE, for example. However, conventional systems may be deficient in accounting for such IRSs. For example, a base station may be unable to account for the IRS when estimating channel conditions for communications (e.g., multiple input multiple output (MIMO) communications) between the base station and the UE.

The techniques described herein may provide for reference signaling schemes and techniques for estimating channel conditions (e.g., channel state information (CSI)) of systems including one or more IRSs. For example, devices in a wireless communications system may implement reference signaling using an IRS device, which may result in efficient communications and enhanced channel estimation (e.g., estimation of the paths between a base station and a user equipment (UE), estimation of the paths between the base station and the UE via relaying signals by an IRS device, or a combination thereof), among other advantages. Devices of a wireless communications (e.g., a base station, a UE, an IRS device, or a combination thereof) may determine a reference signal configuration. For example, the base station may determine a reference signal configuration including a first set of parameters for communication of one or more reference signals. The first set of parameters may indicate a quantity of reference signals, a transmission order of the reference signals, resources for the reference signals, or any combination thereof, among other examples of parameters. In some examples, the base station may indicate the reference signal configuration to the UE, the IRS device, or both.

In some examples, the base station may determine the quantity of reference signals based on using the IRS device for communications with the UE (e.g., based on receiving an indication of the IRS device from the UE, among other examples). The quantity of reference signals may enable channel estimation of various signal paths to the UE (e.g., signal paths using the IRS device and signal paths not using the IRS device). In some examples, the quantity of reference signals may be a quantity of layers of MIMO communications multiplied by a quantity of reflecting elements of the IRS device. For example, the base station may transmit a set of the same reference signals across different reflection coefficient values for the reflecting elements of the IRS device, which may enable the base station to determine reflection coefficients (e.g., of a second set of parameters) for subsequent communications with the UE via the IRS. Additionally or alternatively, the base station may transmit a second set of reference signals for a given set of reflection coefficient values (e.g., the reflection coefficient values may be held constant for the second set of reference signals that includes different reference signals), which may enable the base station to determine channel state information.

The base station may transmit one or more reference signals to the UE in accordance with the first set of parameters of the reference signal configuration (e.g., the base station may transmit a quantity of reference signals in a transmission order indicated by the reference signal configuration). The IRS device may relay a portion of the reference signals to the UE in accordance with the configuration (e.g., the IRS device may reflect the one or more reference signals). The UE may receive the reference signals and indicate the received reference signals to the base station (e.g., the UE may transmit feedback for the reference signals to the base station).

The base station may estimate the channel conditions (e.g., channel state information) based on the received indication. For example, the base station may estimate channel conditions for communicating with the UE via the IRS and channel conditions for communicating with the UE without the IRS. In some examples, the base station may determine a second set of parameters for one or more reflecting elements of the IRS device based on the estimated channel conditions (e.g., the base station may determine a reflection coefficient for each reflecting element of the IRS). The base station may indicate the second set of parameters to the IRS device. The IRS device may adjust the reflection elements based on the indicated second set of parameters (e.g., the IRS may adjust properties of each element in accordance with the second set of parameters for relaying MIMO communications between the base station and UE). Such techniques may enable the base station to communicate with the UE via the IRS relatively efficiently, which may improve reliability and coverage in the system, among other advantages.

Aspects of the disclosure are initially described in the context of wireless communications systems and a process flow. Aspects of the disclosure are further illustrated by and described with reference to apparatus diagrams, system diagrams, and flowcharts that relate to techniques to use reference signals for intelligent reflecting surface systems.

FIG. 1 illustrates an example of a wireless communications system 100 that supports techniques to use reference signals for intelligent reflecting surface systems in accordance with various aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency spectrum band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency spectrum bands, for example, in the range of 300 megahertz (MHz) to 300 gigahertz (GHz). For example, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with an orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may support IRSs. For example, the wireless communications system 100 may support MIMO communications between devices (e.g., a UE 115 and a base station 105) via an IRS. For example, the base station 105 may transmit signals to the IRS for forwarding (e.g., relaying) to one or more UEs 115 (e.g., in addition or alternative to transmitting signals directly to the UEs 115). The IRS may redirect the signals to a UE 115 such that the UE 115 may reliably receive the signals from the base station (e.g., even when there is an obstruction in the path between the base station 105 and the UE 115). In some examples, forwarding signals may include reflecting signals received from the base station 105 to the UE 115 and may be described as redirecting, relaying, or routing the signals. An IRS device may be an example of a surface capable of manipulating the propagation of electromagnetic waves (e.g., signals) in a programmable manner (e.g., reflecting elements of the IRS may be controllable). Such an IRS device may adjust reflecting elements of the surface to improve communications reliability and system performance. In some examples, the reflecting elements may be examples of passive elements (e.g., elements that do not use power to reflect the signals), such as reflective materials (e.g., metal materials, chemical materials, etc.), or the IRS device may use active elements to redirect signals. A device may adjust the properties of such materials to realize different angles for the beam direction of signals. Such passive elements may reduce a power consumption of a system while enabling reliable signal reception for NLOS paths between a base station 105 and a UE 115, for example.

In accordance with the techniques described herein, the wireless communications system 100 may implement reference signaling schemes to estimate channel conditions (e.g., obtain channel state information) when using one or more IRS devices for MIMO communications, for example. The base station 105, the UE 115, the IRS device, or a combination thereof may determine a reference signal configuration. For example, the base station 105 may determine a reference signal configuration including a first set of parameters for communication of one or more reference signals. The first set of parameters may indicate a quantity of reference signals, a transmission order of the reference signals, resources for the reference signals, or any combination thereof, among other examples of parameters.

The base station 105 may transmit the one or more reference signals to the UE 115 in accordance with the first set of parameters of the reference signal configuration. For example, the base station 105 may transmit a quantity of reference signals that supports channel estimation via a signal path using the IRS device and via a signal path that does not use the IRS device. As an illustrative example, the IRS device may relay one or more reference signals to the UE 115 in accordance with the configuration (e.g., the IRS device may reflect the one or more reference signals to the UE 115). The UE 115 may receive the reference signals and indicate the received reference signals to the base station 105 (e.g., the UE 115 may transmit feedback for the reference signals to the base station 105). The base station 105 may estimate the channel conditions (e.g., channel state information) based on the received indication. For example, the base station 105 may estimate channel conditions for communicating with the UE 115 via the IRS and channel conditions for communicating with the UE 115 without the IRS. In some examples, the base station 105 may determine a second set of parameters for one or more reflecting elements of the IRS device based on the estimated channel conditions (e.g., the base station 105 may determine a reflection coefficient for each reflecting element of the IRS). The base station 105 may indicate the second set of parameters to the IRS device. Such techniques may enable the base station 105 to communicate with the UE 115 via the IRS relatively efficiently, which may improve reliability and coverage in the system, among other advantages.

Figure 2:
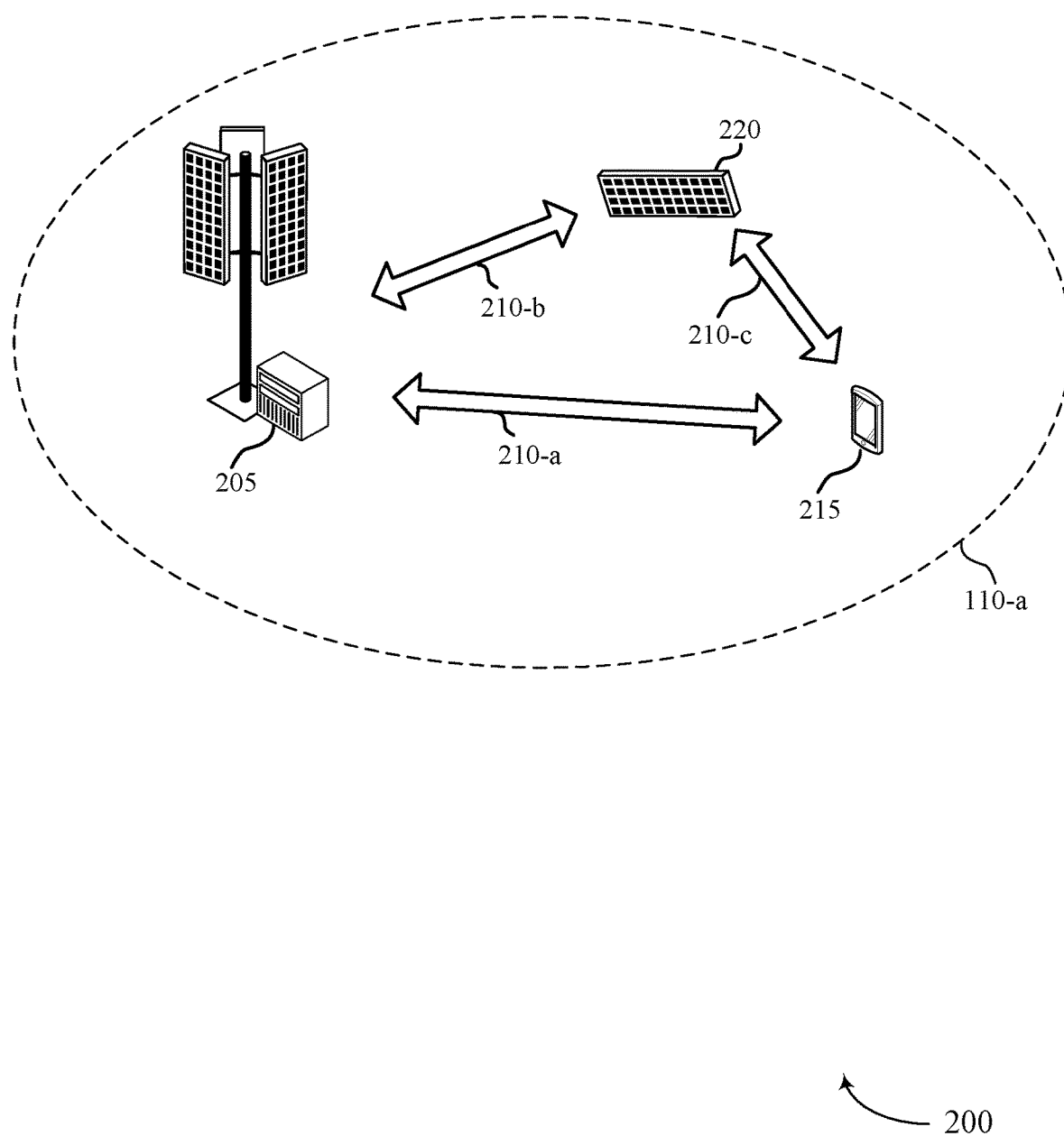
FIG. 2 illustrates an example of a wireless communications system that supports techniques to use reference signals for intelligent reflecting surface systems in accordance with various aspects of the present disclosure.

FIG. 2 illustrates an example of a wireless communications system 200 that supports techniques to use reference signals for intelligent reflecting surface systems in accordance with various aspects of the present disclosure. In some examples, the wireless communications system 200 may implement aspects of wireless communications system 100. For example, the wireless communications system 200 may include a base station 205, a UE 215, and an IRS device 220, which may be examples of the corresponding devices described herein with reference to FIG. 1.

The base station 205 and the UE 215 may send or receive communications 210, which may be examples of MIMO communications. For example, the base station 205 may send or receive communications 210-a to the UE 215 (e.g., the base station 205 may aim signals towards the UE 215, for example, if the base station has a line of sight with the UE 215). Additionally or alternatively, the IRS device 220 may forward communications 210-b or communications 210-c between the UE 215 and the base station 205. In other words, the base station 205 may communicate with the UE 215 without a line of sight (e.g., a NLOS signal path) using the IRS device 220. For example, there may be an obstruction between the base station 205 and the UE 215 which may reduce the signal quality or probability of successful reception of communications 210-a. In such cases, the base station 205 may send communications 210-b in addition or alternative to the communications 210-a. The IRS device 220 may receive the signals of the communications 210-b and forward (e.g., reflect, relay, etc.) the signals via communications 210-c to the UE 215. Such techniques may ensure reliable communications in the system, improved data throughput, or both, among other advantages.

The IRS device 220 may include an IRS, which may be an example of a surface that can reflect an impinging signal and create a NLOS path, for example, to overcome blockage, enhance coverage, enable spatial multiplexing, etc. For example, the IRS may be an example of a surface capable of manipulating the propagation of electromagnetic waves (e.g., signals) in a programmable manner (e.g., reflecting elements of the IRS may be controllable). Such an IRS device may adjust elements of the surface (e.g., reflection elements, reflecting elements, relay components, etc.) to improve communications reliability and system performance. In some examples, the reflecting elements may be examples of passive elements (e.g., elements that do not use power to reflect the signals), such as reflective materials (e.g., metal materials, chemical materials, etc.), or the IRS device may use active elements to redirect signals (e.g., the IRS device may include reception or transmission capabilities to relay signals). A device (e.g., an IRS device or a base station) may adjust the properties of such materials to realize different angles for the beam direction of signals. For instance, the IRS device 220 may determine a set of parameters such as reflection coefficients (e.g., the base station 205 may indicate desired reflection coefficients for the reflection elements based on estimated channel conditions). The IRS device 220 may apply a change to a reflection element in accordance with a respective reflection coefficient (e.g., a reflection coefficient value may indicate to increase or decrease a reflection angle for the beam and the IRS device 220 may adjust a property of the reflection element to obtain the reflection angle). Accordingly, the base station 205 may configure the IRS device 220 with parameters to adjust a transmission angle for a NLOS path between the base station 205 and the UE 215, which may result in improved signal reliability or system performance, while realizing relatively low power consumption, among other examples of advantages.

The wireless communications system 200 may support a reference signal scheme for obtaining channel state information in accordance with the techniques described herein. For example, the base station 205 may be enabled to estimate channel conditions (e.g., channel state information from reference signals) that accounts for the signal paths for communications 210-a as well as the signal paths for communications 210-b and 210-c using the IRS device 220. Such estimated channel conditions may enable the base station 205 to determine parameters for communications to enhance signal reliability and reception at the UE 215 or increase system performance.

The base station 205 may establish communications with the UE 215. For example, the UE 215 may be within the coverage area 110-a, which may be an example of a coverage area 110 as described with reference to FIG. 1. In some examples, the UE 215 may determine that the IRS device 220 is a candidate for relaying communications between the UE 215 and the base station 205. For example, the UE 215 may detect that signals from the base station 205 are being received via communications 210-a in addition or alternative to communications 210-c (e.g., signals from the IRS device 220 may satisfy a threshold). The UE 215 may indicate the IRS device 220 to the base station 205 as a candidate for communications 210.

The devices of the wireless communications system 200 may determine a reference signal configuration. For example, the base station 205 may determine a reference signal configuration based on identifying the IRS device 220 as a candidate for communications with the UE 215 (e.g., in response to the UE 215 indicating the IRS device 220). The base station 205 may determine one or more parameters of the reference signal configuration. For example, the base station 205 may determine a reference signal configuration including a first set of parameters for communication of one or more reference signals. The first set of parameters may indicate a quantity of reference signals, a transmission order of the reference signals, resources for the reference signals, values of one or more reflection coefficients for reflection elements of the IRS device 220 to use for reflecting the reference signals, or any combination thereof, among other examples of parameters for reference signaling. In some examples, the base station may indicate the reference signal configuration to the UE 215, the IRS device 220, or both.

The base station 205 may select a quantity of reference signals based on establishing communications with the UE 215 and/or the IRS device 220. For example, the base station 205 may select a quantity of reference signals to enable channel estimation of a first signal path to the UE 215 (e.g., a signal path using the IRS device 220) and a second signal path to the UE 215 (e.g., a signal path not using the IRS device 220). In some examples, the quantity of reference signals may be a quantity of layers of MIMO communications (e.g., represented as $N_r$) multiplied by a quantity of reflecting elements of the IRS device (e.g., represented as $N_{IRS}$). For example, the quantity of reference signals may be represented as $N_T N_{IRS}$. In other words, the quantity of reference signals may include a first portion of reference signals corresponding to the quantity of layers and a second portion of reference signals corresponding to the quantity of reflecting elements. Such a quantity of reference signals may enable the base station 205 to determine parameters for subsequent communications with the UE 215.

In some examples, a reference signal may be represented by $s_{i,n}$, where $i=1, 2, \ldots N_r$ and $n=1, 2, \ldots N_{IRS}$. In some examples, the first portion of reference signals may include a first set of reference signals associated with a set of coefficients $C_n$, which may represent a matrix including reflection coefficients for each reflection element of the IRS device 220. The value of each reflection coefficient in the set of coefficients $C_n$ may be indicated by the reference signal configuration or preconfigured at the IRS device 220. As an example, the first set of reference signals may be associated with a respective $C_n$ (e.g., the values of $C_n$ may be the same for each reference signal in the set of reference signals) and the base station 205 may vary each reference signal in the first set of reference signals, which may enable the base station to determine channel state information for a given $C_n$ (e.g., using CSI reference signals). In other words, given n, each $s_{i,n}$ may be distinct for each value of i (e.g., each reference signal may be orthogonal in time, frequency, or code).

In some examples, the second portion of reference signals may include a second set of reference signals associated with a respective value of i. For example, given i, each $s_{i,n}$ may be the same for all n and $C_n$ may be configured to be different for each reference signal. In other words, the reference signal may be the same and the values of $C_n$ may be varied at the IRS device 220. Such techniques may enable the base station 205 to determine channel conditions and values for the complex reflection coefficients $C_n$ for the reflection elements of the IRS device 220 to enhance communications 210 with the UE 215.

In some examples, the reference signal configuration may indicate a transmission order (e.g., an order of transmitting the reference signals represented by $s_{i,x}$). For example, the base station 205 (or the IRS device 220 or the UE 215) may select a transmission order from a set of possible transmission orders based on the configuration. In some examples, the reference signals may be transmitted in a time division multiplexing (TDM) manner. As an illustrative example of a transmission order, the order of transmitting the reference signals may be represented by $s_{1,1}, s_{1,2} \ldots s_{1,N_{IRS}}, s_{2,1}, \ldots s_{2,N_{IRS}}, \ldots s_{N_T 1}, \ldots s_{N_T,N_{IRS}}$ or the order may be represented by $s_{1,1}, \ldots s_{N_T 1}, s_{1,2}, \ldots s_{N_T,2}, \ldots s_{1,N_{IRS}}, \ldots s_{N_T,N_{IRS}}$, although any permutation of the transmission order is possible. The reference signal configuration may indicate the transmission order and the base station 205 may transmit the reference signals (and the UE 215 or the IRS device 220 may receive the reference signals) in accordance with the transmission order.

The base station 205 may transmit the quantity of reference signals in accordance with the first set of parameters of the reference signal configuration. The UE 215 may receive the quantity of reference signals (e.g., from the IRS device 220 and/or the base station 205) and indicate the received reference signals to the base station 205. For example, the UE 215 may send feedback indicating the received reference signals to the base station 205. The base station 205 may estimate channel conditions using the feedback. For example, the base station 205 may determine channel state information by comparing the transmitted reference signals to the corresponding reference signals received at the UE 215.

In some examples, the channel (e.g., the MIMO channel) from the source (e.g., the base station 205) to the destination (e.g., the UE 215) may be represented with reference to Equation 1:

$$\begin{bmatrix} y_1 \\ \vdots \\ y_{N_R} \end{bmatrix} = \left( \sum_{n=1}^{N_{IRS}} \begin{bmatrix} a_{1,n} \\ \vdots \\ a_{N_R,n} \end{bmatrix} C_n [b_{1,n} \ldots b_{N_T,n}] + \sum_k \begin{bmatrix} g_{1,k} \\ \vdots \\ g_{N_R,k} \end{bmatrix} [h_{1,k} \ldots h_{N_T,k}] \right) \begin{bmatrix} x_1 \\ \vdots \\ x_{N_T} \end{bmatrix} \quad (1)$$

In Equation 1, y may represent a signal received at the UE 215 and x may represent the signal transmitted from the base station 205 (e.g., $N_T$ may represent the number of transmit antennas and $N_R$ may represent the number of receive antennas). The first summation term from n=1 to $N_{IRS}$ may represent the channel conditions of the signal path from the base station 205 to the UE 215 via the IRS device 220. The second summation term may represent the channel conditions of the signal path not via the IRS device 220. Each of the signal paths may be line of sight paths or non-line of sight paths. The first summation term may be absent in a system without the IRS device 220, as an example. As described herein, $C_n$ may represent the complex reflection coefficient of an IRS element n.

Accordingly, the base station 205 may determine channel state information for communications 210, which may be represented with reference to Equation 2:

$$\begin{bmatrix} a_{1,n} \\ \vdots \\ a_{N_T,n} \end{bmatrix} [b_{1,n} \ \ldots \ b_{N_R,n}], n = 1, 2, \ldots, n, \sum_i \begin{bmatrix} g_{1,n} \\ \vdots \\ g_{N_T,n} \end{bmatrix} [h_{1,n} \ \ldots \ h_{N_R,n}] \quad (2)$$

In Equation 2, the various parameters (e.g., a, b, g, and h) may represent channel conditions (e.g., how a signal x propagates from the base station 205 to the UE 215 via the channel).

The base station 205 may determine a second set of parameters, a third set of parameters, or both for subsequent communications with the UE 215 using the estimate channel state information. For example, the base station 205 may determine a second set of parameters for the IRS device 220 using the channel conditions. The second set of parameters may include a set of reflection coefficients (e.g., $C_n$ for each reflection element of the IRS device 220). The base station 205 may determine the second set of parameters such that the properties of the reflection elements result in a relatively high performance. The base station 205 may indicate the second set of parameters to the IRS device 220. Additionally or alternatively, the base station 205 may determine a third set of parameters using the channel conditions and indicate the third set of parameters to the UE 215 (e.g., the UE 215 may adjust one or more antennas to receive subsequent communications in accordance with the third set of parameters).

The IRS device 220 may adjust the reflection elements of the IRS device 220 in accordance with the received parameters. For example, the IRS device 220 may adjust the properties of the surface (e.g., each element) such that an angle between a received signal and a relayed signal (e.g., a transmitted or reflected signal) satisfies a respective parameter of the second set of parameters. Accordingly, the IRS device 220 may relay MIMO communications between the base station 205 and the UE 215.

As an illustrative example of the reference schemes described herein, $N_T=N_R=N_r=N_{IRS}=2$. In such examples, the channel may be modeled using Equation 1, which may result in Equation 3:

$$\begin{bmatrix} a_{1,1} \\ a_{2,1} \end{bmatrix} C_1 [b_{1,1} \ b_{2,1}] + \begin{bmatrix} a_{1,2} \\ a_{2,2} \end{bmatrix} C_2 [b_{1,2} \ b_{2,2}] + \begin{bmatrix} g_1 \\ g_2 \end{bmatrix} [h_1 \ h_2] \quad (3)$$

The base station 205 may determine (e.g., learn) the channel state information using Equation 3. For example, the base station 205 may transmit 6 reference signals (e.g., $N_r(N_{IRS}+1)$ reference signals). For example, in symbols 1, 2, and 3, the base station 205 may transmit $$\begin{bmatrix} 1 \\ 0 \end{bmatrix}$$

CSI reference signals (i.e., x=1 in a first transmission antenna and x=0 in a second transmission antenna). In symbol 1, $C_1=1$, $C_2=0$. In symbol 2, $C_1=0$, $C_2=1$. In symbol 3, $C_1=0$, $C_2=0$. That is, the values of $C_n$ may be varied in each symbol of symbols 1 through 3. In symbols 4, 5, and 6, the base station 205 may transmit $$\begin{bmatrix} 0 \\ 1 \end{bmatrix}$$

CSI reference signals (i.e., x=0 in the first transmission antenna and x=1 in the second transmission antenna). In symbol 4, $C_1=1$, $C_2=0$, in symbol 5, $C_1=0$, $C_2=1$, and in symbol 6, $C_1=0$, $C_2=0$. Accordingly, the UE 215 or the base station 205 may estimate $a_{1,1}b_{2,1}$, $a_{2,1}b_{2,1}$, $a_{1,2}b_{1,2}$, $a_{1,2}b_{2,2}$, $a_{2,2}b_{1,2}a_{2,2}b_{2,2}$, $g_1h_1$, $g_1h_2$, $g_2h_1$, $g_2h_2$ of Equation 3, which may represent the channel conditions. The base station 205 may determine $C_1$ and $C_2$ such that the values result in relatively high performance of the two-by-two channel (e.g., a physical downlink shared channel (PDSCH)).

As an illustrative example, the base station 205 may select a first set of values for the coefficients $C_1$ and $C_2$ and calculate a performance of the channel using the various parameters above (e.g., $a_{1,1}b_{1,1}$ etc.). The base station 205 may vary the values (e.g., select a second set of value, a third set of value, etc.) and repeat the calculations for a range of possible values. The base station 205 may determine a relatively highest performance set of values (e.g., a set of values that results in a metric that satisfies a threshold or is a lowest channel condition number indicating a relatively high-performance channel). The base station 205 may indicate the values as part of the second set of parameters.

The various examples shown and described in the wireless communications system 200 may be modified. For example, different devices may perform various operations, some operations may not be performed, or additional operations may be performed. As an example, the IRS device 220 may estimate channel conditions or otherwise receive an indication of the channel conditions and determine the second set of parameters rather than the base station 205 indicating the second set of parameters to the IRS device 220. Additionally or alternatively, the techniques described herein may be applied to any quantity of devices (e.g., the base station 205 may communicate with multiple UEs 115 or other base station 105 using one or more IRS devices 220).

Figure 3:
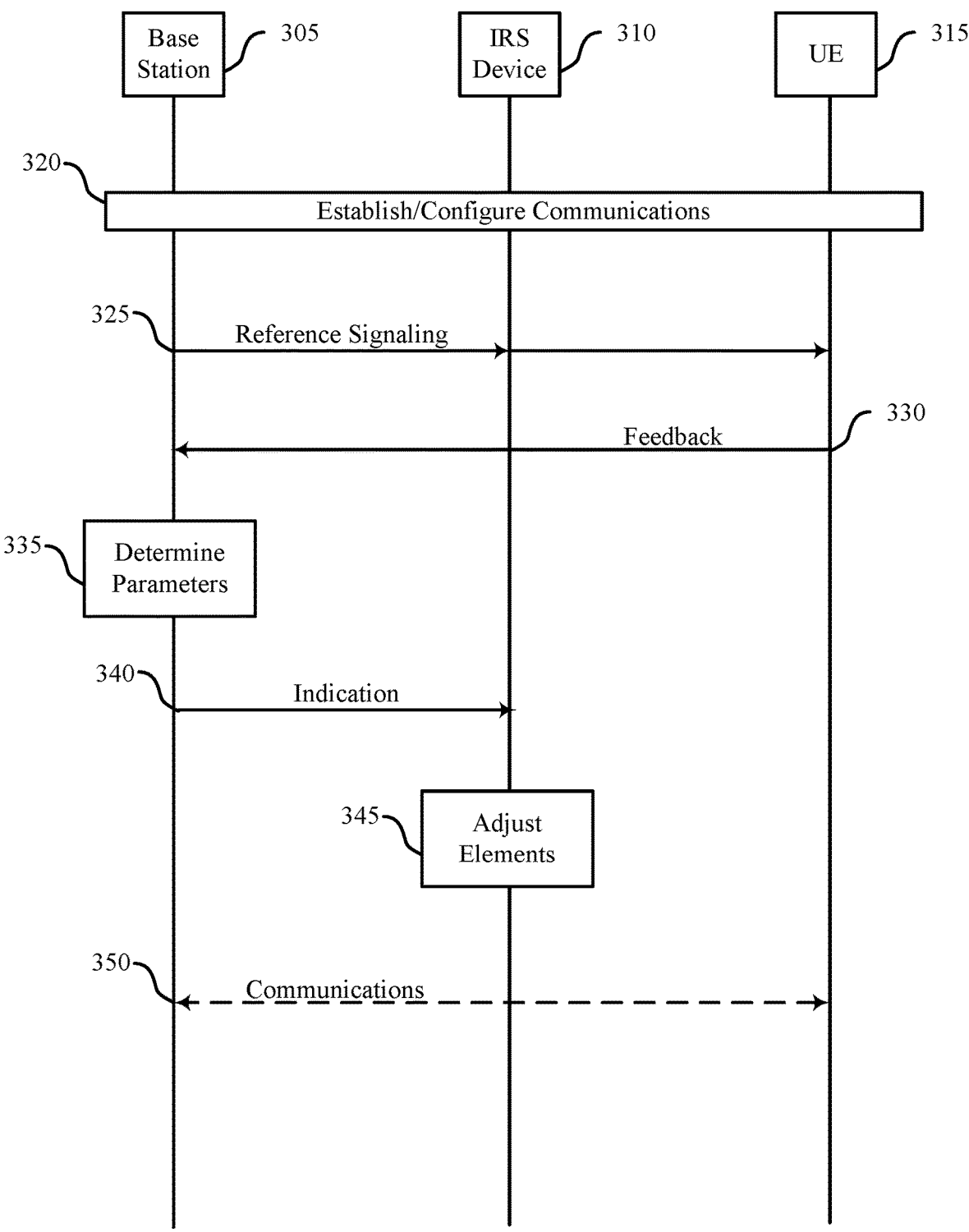
FIG. 3 illustrates an example of a process flow that supports techniques to use reference signals for intelligent reflecting surface systems in accordance with various aspects of the present disclosure.

FIG. 3 illustrates an example of a process flow 300 that supports techniques to use reference signals for intelligent reflecting surface systems in accordance with various aspects of the present disclosure. In some examples, the process flow 300 may implement aspects of the wireless communications system 100, the wireless communications system 200, or both. For example, the process flow 300 may illustrate communications between a base station 305, an IRS device 310, and a UE 315, which may be examples of the corresponding devices described herein with reference to FIGS. 1 and 2.

At 320, the base station 305, the IRS device 310, and the UE 315 may establish or configure communications. For example, the base station 305 may indicate a reference signal configuration to the IRS device 310 and/or the UE 315. The reference signal configuration may indicate a first set of parameters associated with communication of one or more reference signals.

At 325, the base station 305 may transmit the one or more reference signals to the IRS device 310, the UE 315, or both. For example, the base station 305 may transmit the reference signals in accordance with the first set of parameters (e.g., using a transmission order, a determined quantity of reference signals, etc.) as described with reference to FIG. 2.

At 330, the UE 315 may transmit feedback for the one or more reference signals to the base station 305 (e.g., the UE 315 may indicate the received reference signals to the base station 305).

At 335, the base station 305 may determine parameters based on the feedback. For example, the base station 305 may use the feedback to estimate the channel conditions (e.g., the channel state information) and determine a second set of parameters for reflection elements of the IRS device 310 based on the estimation, as described with reference to FIG. 2.

At 340, the base station 305 may send an indication to the IRS device 310. The indication may indicate the determined second set of parameters (e.g., reflection coefficients). At 345, the IRS device 310 may adjust one or more reflection elements in response to receiving the indication of the second set of parameters.

At 350, the base station 305 and the UE 315 may communicate using the IRS device 310. For example, the base station 305 may transmit communications via a NLOS signal path and the IRS device 310 may relay the communications to the UE 315 as described herein.

Figure 4:
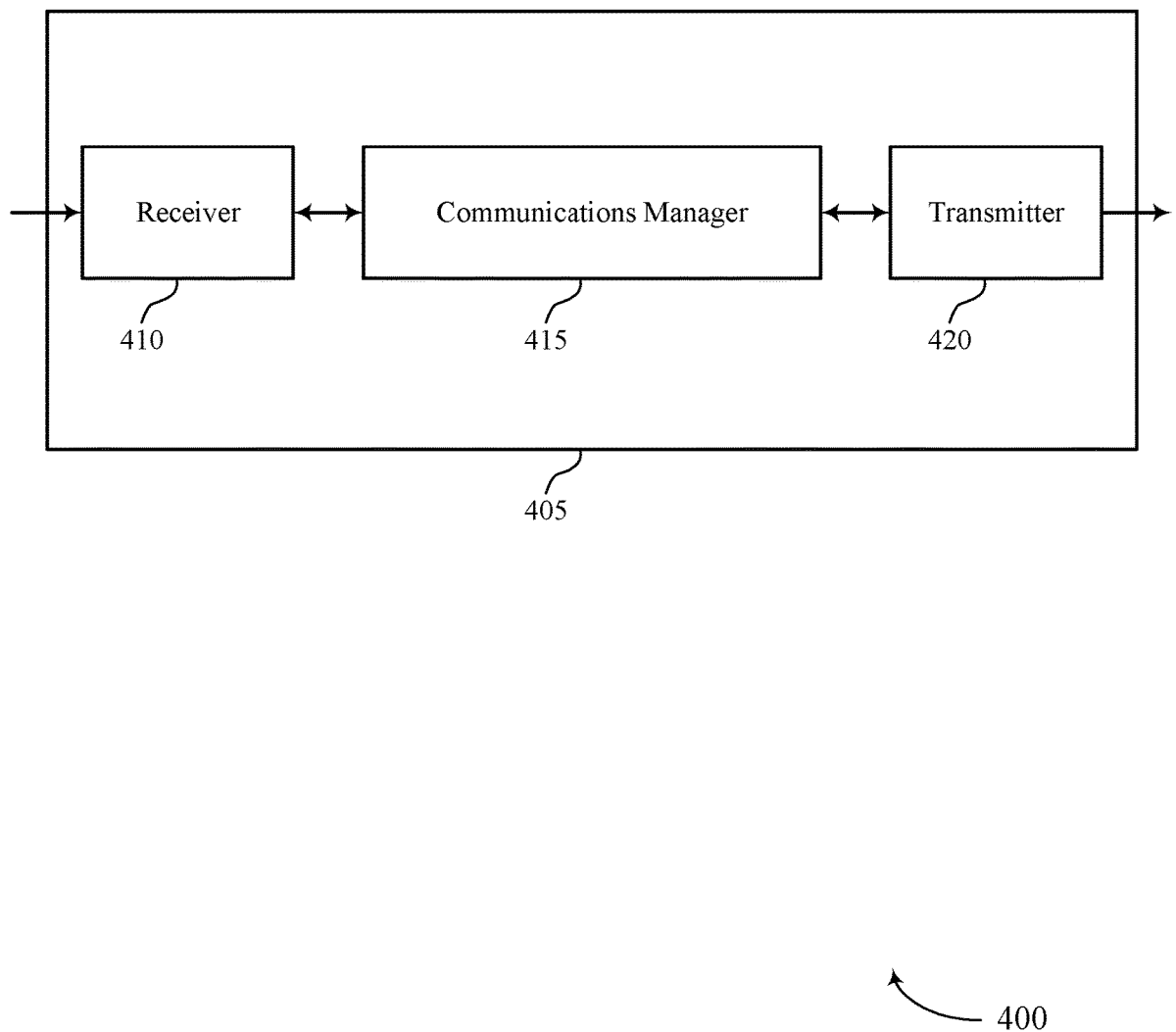
FIGS. 4 and 5 show block diagrams of devices that support techniques to use reference signals for intelligent reflecting surface systems in accordance with various aspects of the present disclosure.

FIG. 4 shows a block diagram 400 of a device 405 that supports techniques to use reference signals for intelligent reflecting surface systems in accordance with various aspects of the present disclosure. The device 405 may be an example of aspects of a UE 115 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to techniques to use reference signals for intelligent reflecting surface systems, etc.). Information may be passed on to other components of the device 405. The receiver 410 may be an example of aspects of the transceiver 720 described with reference to FIG. 7. The receiver 410 may utilize a single antenna or a set of antennas.

The communications manager 415 may receive one or more reference signals in accordance with a first set of parameters of a reference signal configuration, the first set of parameters associated with reception of one or more reference signals using an intelligent reflecting surface device, transmit, to at least one of the base station, the intelligent reflecting surface device, or a combination thereof, channel status information based on the received one or more reference signals, and communicate with the base station using the intelligent reflecting surface device based on the channel status information. The communications manager 415 may be an example of aspects of the communications manager 710 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The communications manager 415 as described herein may be implemented to realize one or more potential advantages. One implementation may allow the device 405 to implement reference signaling using one or more IRS devices, which may enable efficient communications and enhanced channel estimation (e.g., estimation of the paths between a base station and a UE, estimation of the paths between the base station and the UE via relaying signals by an IRS device, or a combination thereof), among other advantages. Accordingly, the techniques described herein may result in improved system performance and enhanced communications at a UE or other devices.

The transmitter 420 may transmit signals generated by other components of the device 405. In some examples, the transmitter 420 may be collocated with a receiver 410 in a transceiver component. For example, the transmitter 420 may be an example of aspects of the transceiver 720 described with reference to FIG. 7. The transmitter 420 may utilize a single antenna or a set of antennas.

Figure 5:
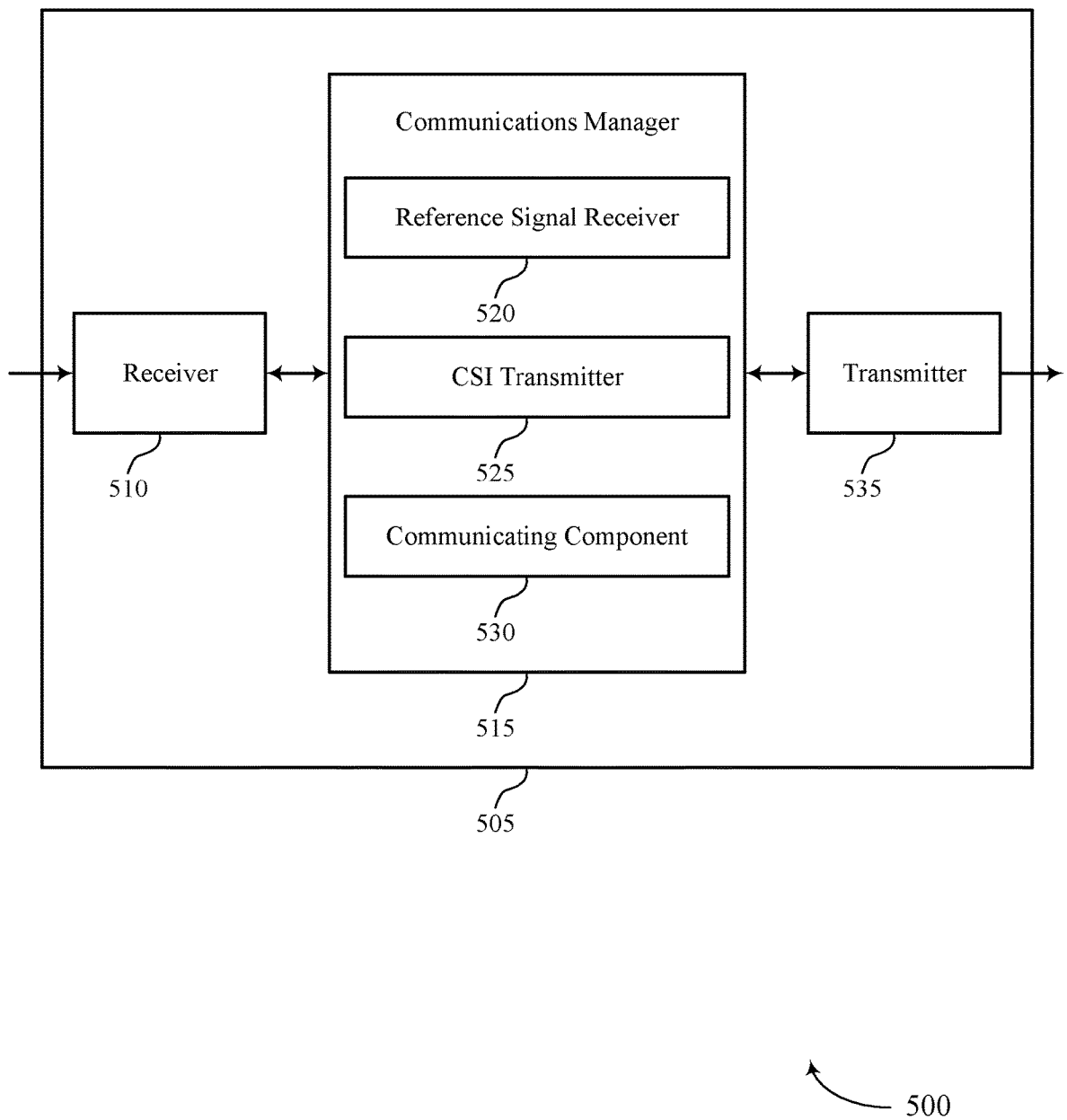

FIG. 5 shows a block diagram 500 of a device 505 that supports techniques to use reference signals for intelligent reflecting surface systems in accordance with various aspects of the present disclosure. The device 505 may be an example of aspects of a device 405, or a UE 115 as described herein. The device 505 may include a receiver 510, a communications manager 515, and a transmitter 535. The device 505 may also include a processor. Each of these components may be in communication with one another (e.g., via one or more buses).

The receiver 510 may receive information such as packets, user data, or control information associated with various information channels (e.g., control channels, data channels, and information related to techniques to use reference signals for intelligent reflecting surface systems, etc.). Information may be passed on to other components of the device 505. The receiver 510 may be an example of aspects of the transceiver 720 described with reference to FIG. 7. The receiver 510 may utilize a single antenna or a set of antennas.

The communications manager 515 may be an example of aspects of the communications manager 415 as described herein. The communications manager 515 may include a reference signal receiver 520, a CSI transmitter 525, and a communicating component 530. The communications manager 515 may be an example of aspects of the communications manager 710 described herein.

The reference signal receiver 520 may receive one or more reference signals in accordance with a first set of parameters of a reference signal configuration, the first set of parameters associated with reception of one or more reference signals using an intelligent reflecting surface device.

The CSI transmitter 525 may transmit, to at least one of the base station, the intelligent reflecting surface device, or a combination thereof, channel status information based on the received one or more reference signals.

The communicating component 530 may communicate with the base station using the intelligent reflecting surface device based on the channel status information.

The transmitter 535 may transmit signals generated by other components of the device 505. In some examples, the transmitter 535 may be collocated with a receiver 510 in a transceiver component. For example, the transmitter 535 may be an example of aspects of the transceiver 720 described with reference to FIG. 7. The transmitter 535 may utilize a single antenna or a set of antennas.

Figure 6:
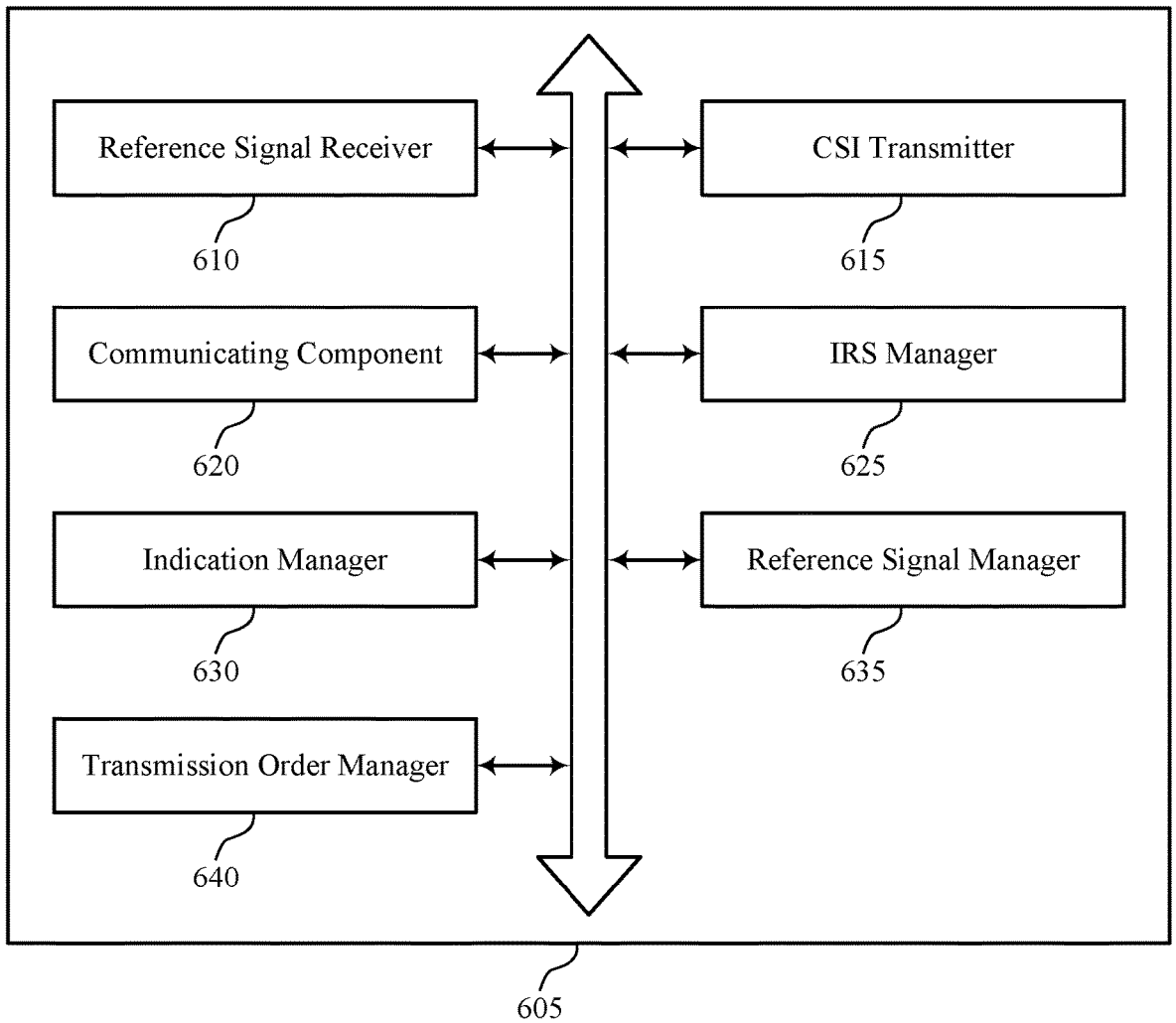
FIG. 6 shows a block diagram of a communications manager that supports techniques to use reference signals for intelligent reflecting surface systems in accordance with various aspects of the present disclosure.

FIG. 6 shows a block diagram 600 of a communications manager 605 that supports techniques to use reference signals for intelligent reflecting surface systems in accordance with various aspects of the present disclosure. The communications manager 605 may be an example of aspects of a communications manager 415, a communications manager 515, or a communications manager 710 described herein. The communications manager 605 may include a reference signal receiver 610, a CSI transmitter 615, a communicating component 620, an IRS manager 625, an indication manager 630, a reference signal manager 635, and a transmission order manager 640. Each of these components may communicate, directly or indirectly, with one another (e.g., via one or more buses).

The reference signal receiver 610 may receive one or more reference signals in accordance with a first set of parameters of a reference signal configuration, the first set of parameters associated with reception of one or more reference signals using an intelligent reflecting surface device.

The CSI transmitter 615 may transmit, to at least one of the base station, the intelligent reflecting surface device, or a combination thereof, channel status information based on the received one or more reference signals.

The communicating component 620 may communicate with the base station using the intelligent reflecting surface device based on the channel status information.

In some cases, the communicating with the base station includes receiving a multiple input multiple output data transmission.

The IRS manager 625 may identify an intelligent reflecting surface device for communications with a base station.

The indication manager 630 may transmit an indication of the identified intelligent reflecting surface device to the base station.

The reference signal manager 635 may identify a quantity of the one or more reference signals based on the received reference signal configuration.

In some examples, the reference signal manager 635 may identify a first portion of the quantity of the one or more reference signals and a second portion of the quantity of the one or more reference signals.

In some cases, the first portion corresponds to a quantity of layers of multiple input multiple output communications with the base station and the second portion corresponds to a quantity of one or more reflecting elements of the intelligent reflecting surface device.

In some cases, the first portion includes a first set of reference signals associated with a first parameter of the second set of parameters, and where the second portion includes a second set of reference signals associated with the second set of parameters.

The transmission order manager 640 may identify a transmission order of the quantity of the one or more reference signals, where receiving the one or more reference signals includes receiving the one or more reference signals in accordance with the identified transmission order.

Figure 7:
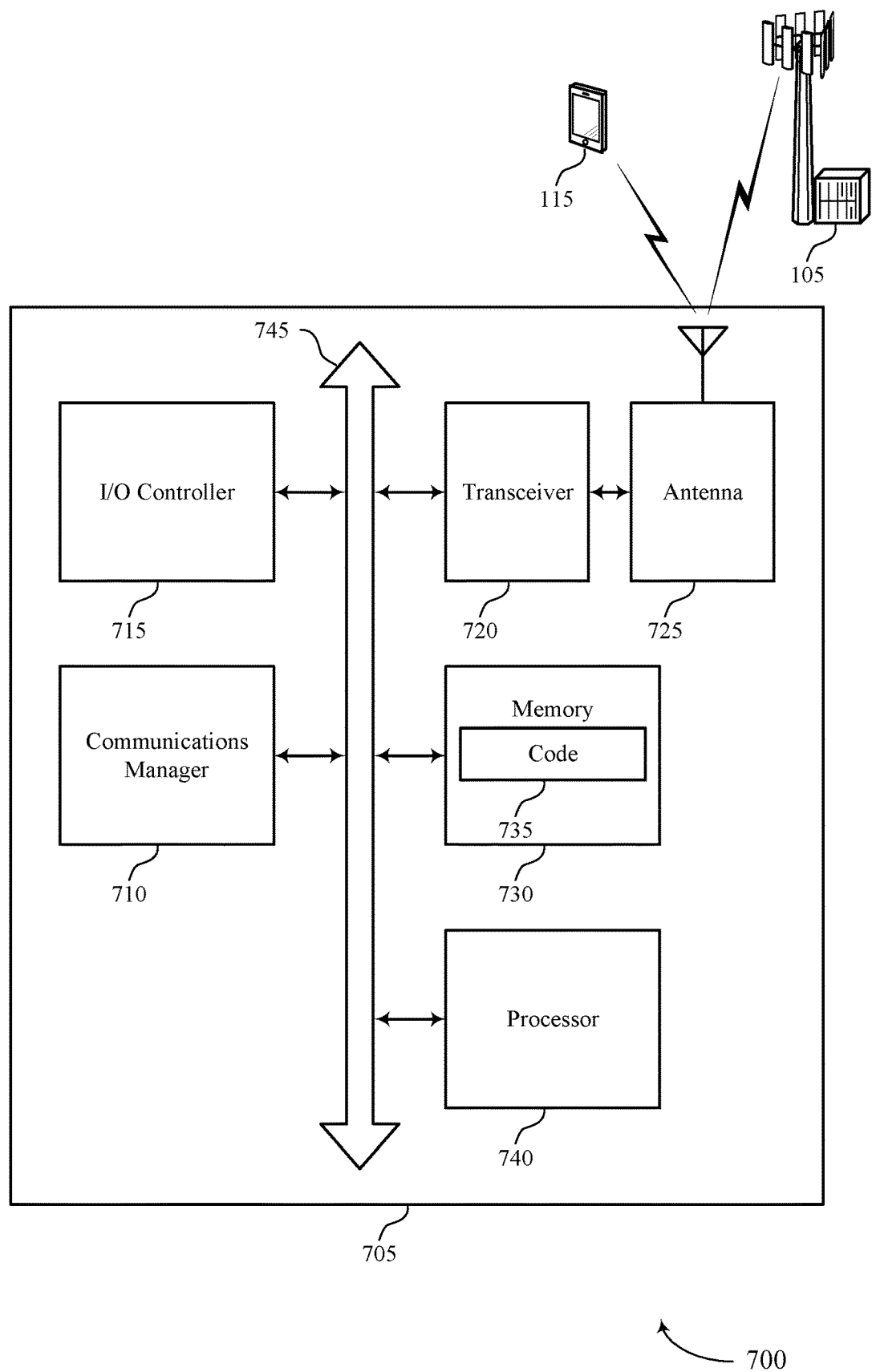
FIG. 7 shows a diagram of a system including a device that supports techniques to use reference signals for intelligent reflecting surface systems in accordance with various aspects of the present disclosure.

FIG. 7 shows a diagram of a system 700 including a device 705 that supports techniques to use reference signals for intelligent reflecting surface systems in accordance with various aspects of the present disclosure. The device 705 may be an example of or include the components of device 405, device 505, or a UE 115 as described herein. The device 705 may include components for bi-directional voice and data communications including components for transmitting and receiving communications, including a communications manager 710, an I/O controller 715, a transceiver 720, an antenna 725, memory 730, and a processor 740. These components may be in electronic communication via one or more buses (e.g., bus 745).

The communications manager 710 may receive one or more reference signals in accordance with a first set of parameters of a reference signal configuration, the first set of parameters associated with reception of one or more reference signals using an intelligent reflecting surface device, transmit, to at least one of the base station, the intelligent reflecting surface device, or a combination thereof, channel status information based on the received one or more reference signals, and communicate with the base station using the intelligent reflecting surface device based on the channel status information.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS®, ANDROID®, MS-DOS®, MS-WINDOWS®, OS/2®, UNIX®, LINUX®, or another known operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas.

In some cases, the wireless device may include a single antenna 725. However, in some cases the device may have more than one antenna 725, which may be capable of concurrently transmitting or receiving multiple wireless transmissions.

The memory 730 may include random access memory (RAM) and read-only memory (ROM). The memory 730 may store computer-readable, computer-executable code 735 including instructions that, when executed, cause the processor to perform various functions described herein. In some cases, the memory 730 may contain, among other things, a basic input/output system (BIOS) which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques to use reference signals for intelligent reflecting surface systems).

The code 735 may include instructions to implement aspects of the present disclosure, including instructions to support wireless communications. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
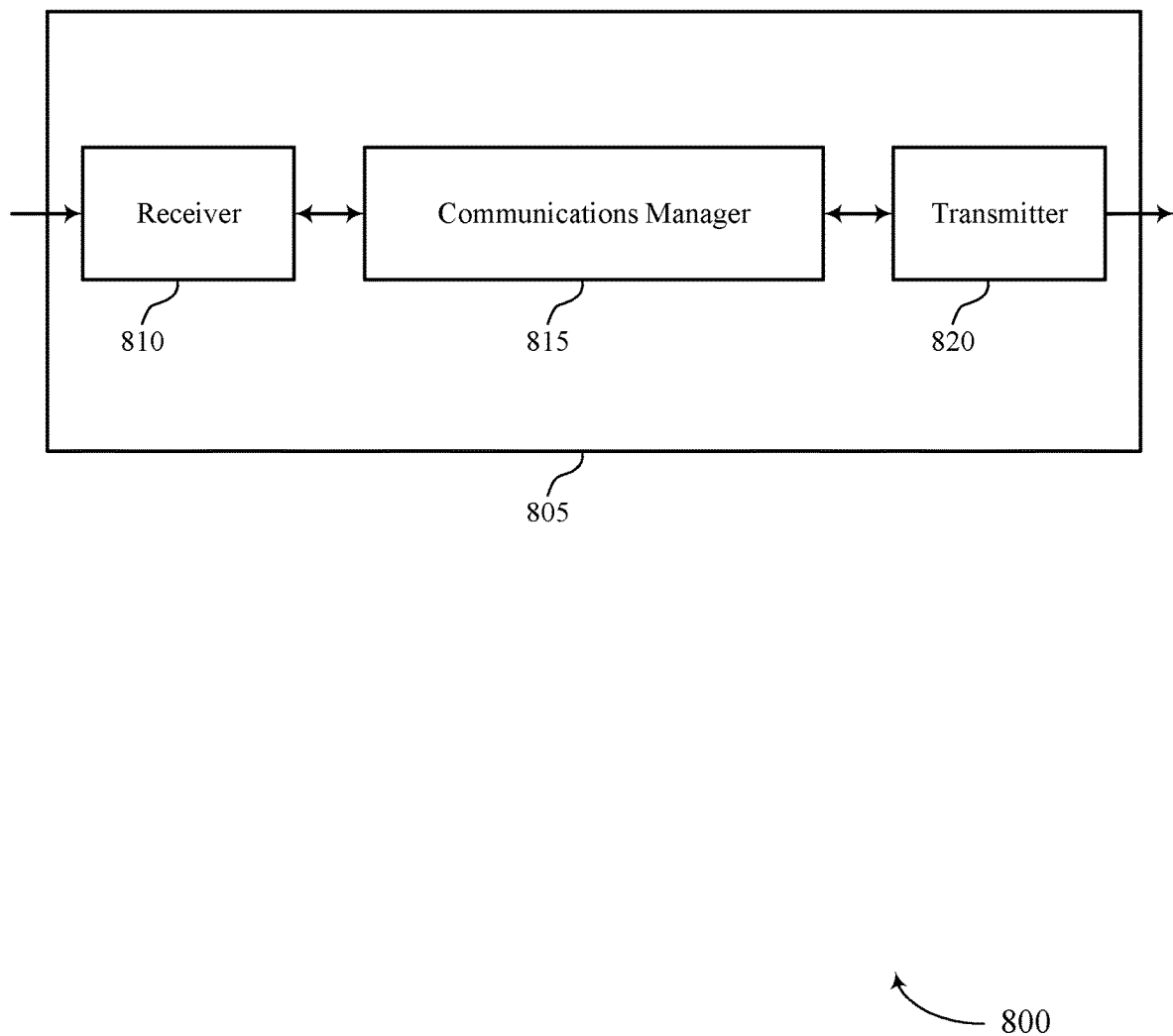
FIGS. 8 and 9 show block diagrams of devices that support techniques to use reference signals for intelligent reflecting surface systems in accordance with various aspects of the present disclosure.

FIG. 8 shows a block diagram 800 of a device 805 that supports techniques to use reference signals for intelligent reflecting surface systems in accordance with various aspects of the present disclosure. The device 805 may be an example of aspects of a base station 105 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to techniques to use reference signals for intelligent reflecting surface systems, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may identify an intelligent reflecting surface device for communications with a UE, determine a reference signal configuration based on the identified intelligent reflecting surface device, the reference signal configuration including a first set of parameters associated with the intelligent reflecting surface device, transmit one or more reference signals in accordance with the first set of parameters of the reference signal configuration, and identify a second set of parameters associated with one or more reflecting elements of the intelligent reflecting surface device. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver component. For example, the transmitter 820 may be an example of aspects of the transceiver 1120 described with reference to FIG. 11. The transmitter 820 may utilize a single antenna or a set of antennas.

Figure 9:
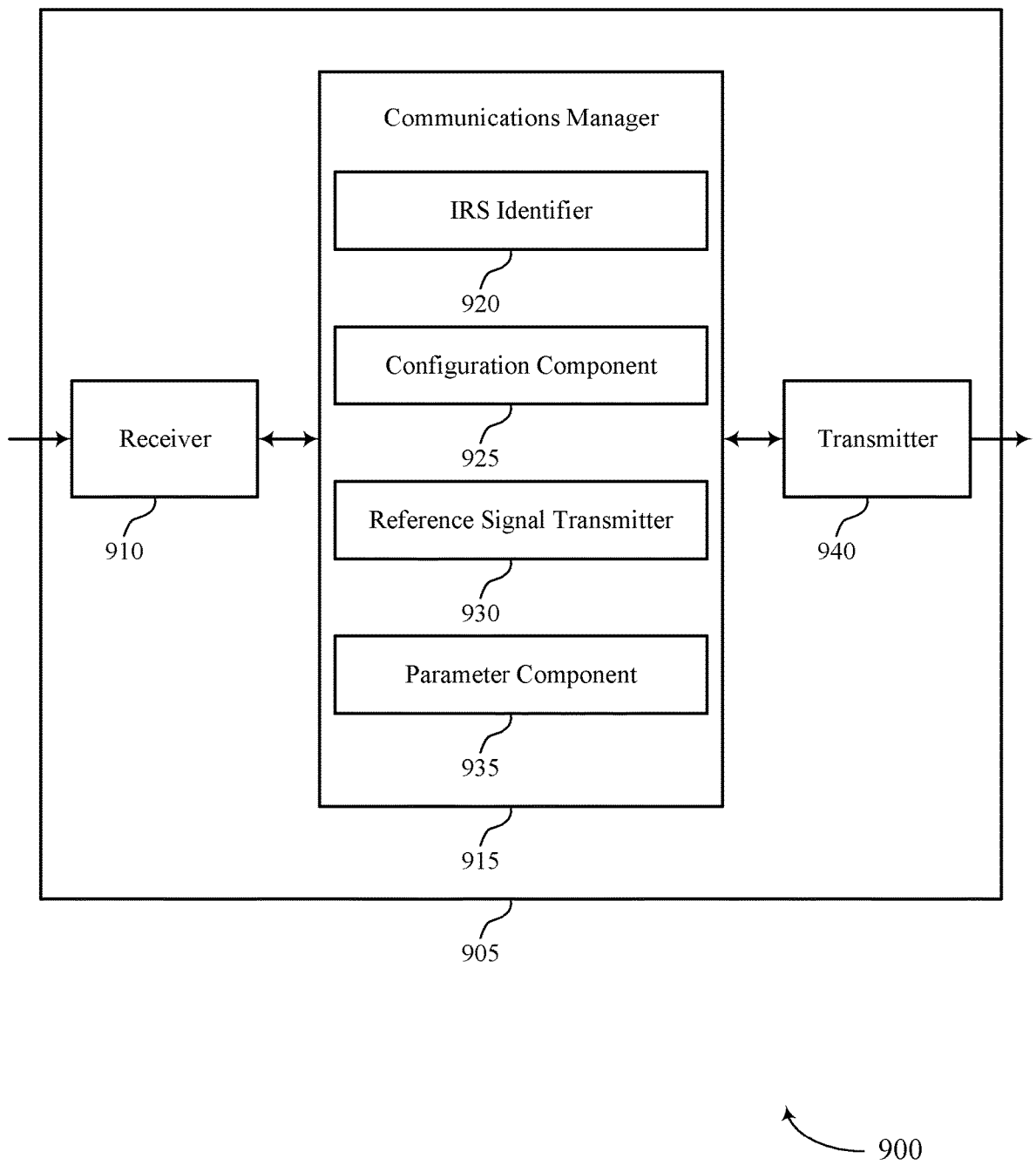

FIG. 9 shows a block diagram 900 of a device 905 that supports techniques to use reference signals for intelligent reflecting surface systems in accordance with various aspects of the present disclosure. The device 905 may be an example of aspects of a device 805, or a base station 105 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to techniques to use reference signals for intelligent reflecting surface systems, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include an IRS identifier 920, a configuration component 925, a reference signal transmitter 930, and a parameter component 935. The communications manager 915 may be an example of aspects of the communications manager 1110 described herein.

The IRS identifier 920 may identify an intelligent reflecting surface device for communications with a UE.

The configuration component 925 may determine a reference signal configuration based on the identified intelligent reflecting surface device, the reference signal configuration including a first set of parameters associated with the intelligent reflecting surface device.

The reference signal transmitter 930 may transmit one or more reference signals in accordance with the first set of parameters of the reference signal configuration.

The parameter component 935 may identify a second set of parameters associated with one or more reflecting elements of the intelligent reflecting surface device.

The transmitter 940 may transmit signals generated by other components of the device 905. In some examples, the transmitter 940 may be collocated with a receiver 910 in a transceiver component. For example, the transmitter 940 may be an example of aspects of the transceiver 1120 described with reference to FIG. 11. The transmitter 940 may utilize a single antenna or a set of antennas.

Figure 10:
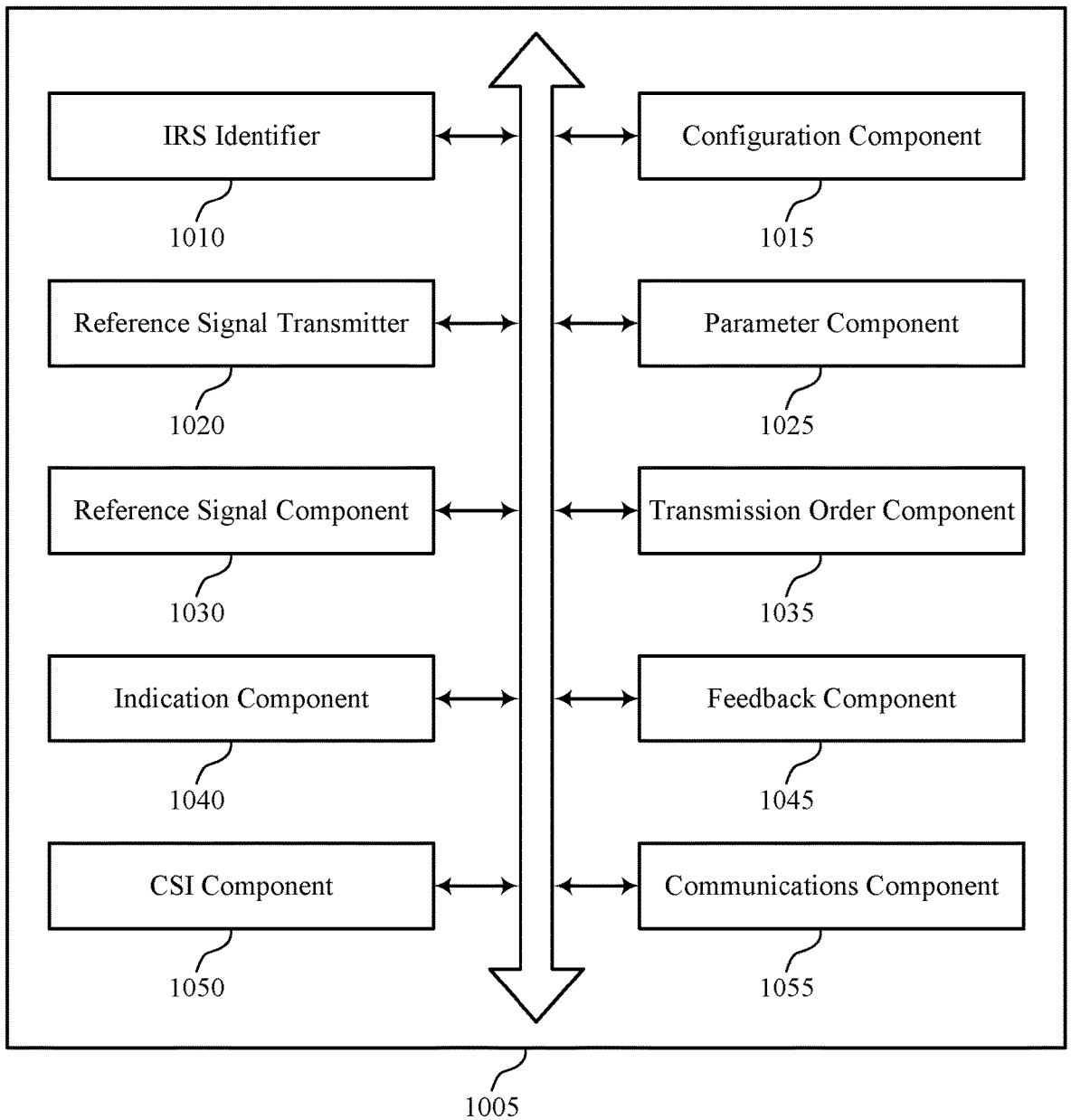
FIG. 10 shows a block diagram of a communications manager that supports techniques to use reference signals for intelligent reflecting surface systems in accordance with various aspects of the present disclosure.

FIG. 10 shows a block diagram 1000 of a communications manager 1005 that supports techniques to use reference signals for intelligent reflecting surface systems in accordance with various aspects of the present disclosure. The communications manager 1005 may be an example of aspects of a communications manager 815, a communications manager 915, or a communications manager 1110 described herein. The communications manager 1005 may include an IRS identifier 1010, a configuration component 1015, a reference signal transmitter 1020, a parameter component 1025, a reference signal component 1030, a transmission order component 1035, an indication component 1040, a feedback component 1045, a CSI component 1050, and a communications component 1055. Each of these components may communicate, directly or indirectly, with one another (e.g., via one or more buses).

The IRS identifier 1010 may identify an intelligent reflecting surface device for communications with a UE.

The configuration component 1015 may determine a reference signal configuration based on the identified intelligent reflecting surface device, the reference signal configuration including a first set of parameters associated with the intelligent reflecting surface device.

In some examples, the configuration component 1015 may transmit, to at least one of the UE, the intelligent reflecting surface device, or a combination thereof, the reference signal configuration.

The reference signal transmitter 1020 may transmit one or more reference signals in accordance with the first set of parameters of the reference signal configuration.

The parameter component 1025 may identify a second set of parameters associated with one or more reflecting elements of the intelligent reflecting surface device.

The reference signal component 1030 may identify a quantity of the one or more reference signals based on the identified intelligent reflecting surface device.

In some examples, the reference signal component 1030 may identify a first portion of the quantity of the one or more reference signals and a second portion of the quantity of the one or more reference signals.

In some cases, the first portion corresponds to a quantity of layers of multiple input multiple output communications with the UE and the second portion corresponds to a quantity of the one or more reflecting elements of the intelligent reflecting surface device.

In some cases, the first portion includes a first set of reference signals associated with a first parameter of the second set of parameters, and where the second portion includes a second set of reference signals associated with the second set of parameters.

The transmission order component 1035 may identify a transmission order of the quantity of the one or more reference signals, where transmitting the one or more reference signals includes transmitting the one or more reference signals in accordance with the identified transmission order.

In some cases, the reference signal configuration indicates the transmission order.

The indication component 1040 may transmit, to the intelligent reflecting surface device, an indication of the identified second set of parameters.

In some examples, the indication component 1040 may receive, from the UE, an indication of the intelligent reflecting surface device, where identifying the intelligent reflecting surface device is based on the received indication.

The feedback component 1045 may receive, from the UE in response to transmitting the one or more reference signals, feedback for the one or more reference signals.

The CSI component 1050 may estimate channel state information based on the received feedback.

In some examples, the CSI component 1050 may identify the second set of parameters is based on the estimated channel state information.

The communications component 1055 may communicate with the UE using the intelligent reflecting surface device in accordance with the second set of parameters associated with the one or more reflecting elements and a third set of parameters associated with one or more antennas of the UE, where the communications include a multiple input multiple output data transmission.

Figure 11:
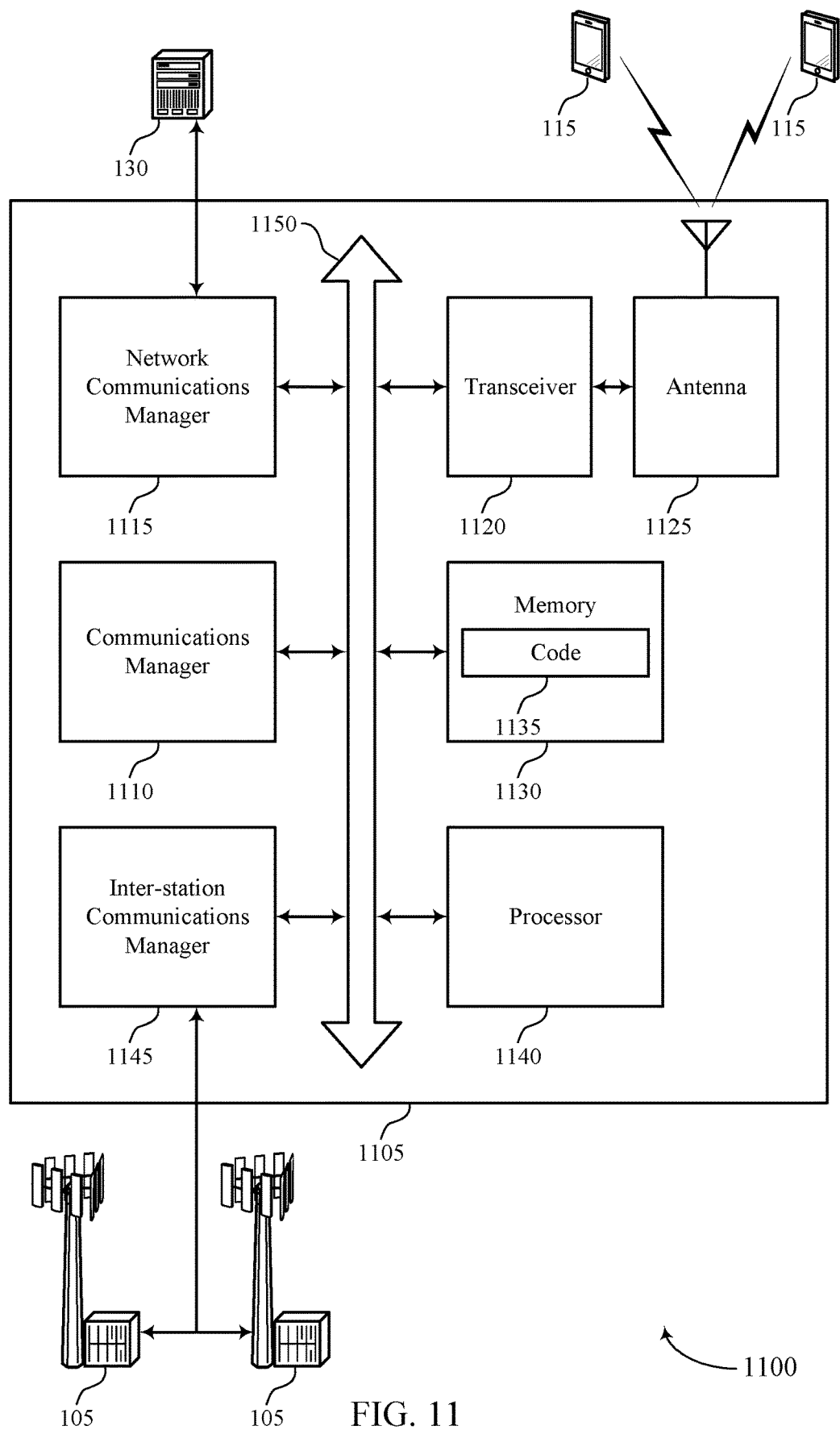
FIG. 11 shows a diagram of a system including a device that supports techniques to use reference signals for intelligent reflecting surface systems in accordance with various aspects of the present disclosure.

FIG. 11 shows a diagram of a system 1100 including a device 1105 that supports techniques to use reference signals for intelligent reflecting surface systems in accordance with various aspects of the present disclosure. The device 1105 may be an example of or include the components of device 805, device 905, or a base station 105 as described herein. The device 1105 may include components for bi-directional voice and data communications including components for transmitting and receiving communications, including a communications manager 1110, a network communications manager 1115, a transceiver 1120, an antenna 1125, memory 1130, a processor 1140, and an inter-station communications manager 1145. These components may be in electronic communication via one or more buses (e.g., bus 1150).

The communications manager 1110 may identify an intelligent reflecting surface device for communications with a UE, determine a reference signal configuration based on the identified intelligent reflecting surface device, the reference signal configuration including a first set of parameters associated with the intelligent reflecting surface device, transmit one or more reference signals in accordance with the first set of parameters of the reference signal configuration, and identify a second set of parameters associated with one or more reflecting elements of the intelligent reflecting surface device.

The network communications manager 1115 may manage communications with the core network (e.g., via one or more wired backhaul links). For example, the network communications manager 1115 may manage the transfer of data communications for client devices, such as one or more UEs 115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM, ROM, or a combination thereof. The memory 1130 may store computer-readable code 1135 including instructions that, when executed by a processor (e.g., the processor 1140) cause the device to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some cases, a memory controller may be integrated into processor 1140. The processor 1140 may be configured to execute computer-readable instructions stored in a memory (e.g., the memory 1130) to cause the device 1105 to perform various functions (e.g., functions or tasks supporting techniques to use reference signals for intelligent reflecting surface systems).

The inter-station communications manager 1145 may manage communications with other base station 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communication network technology to provide communication between base stations 105.

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
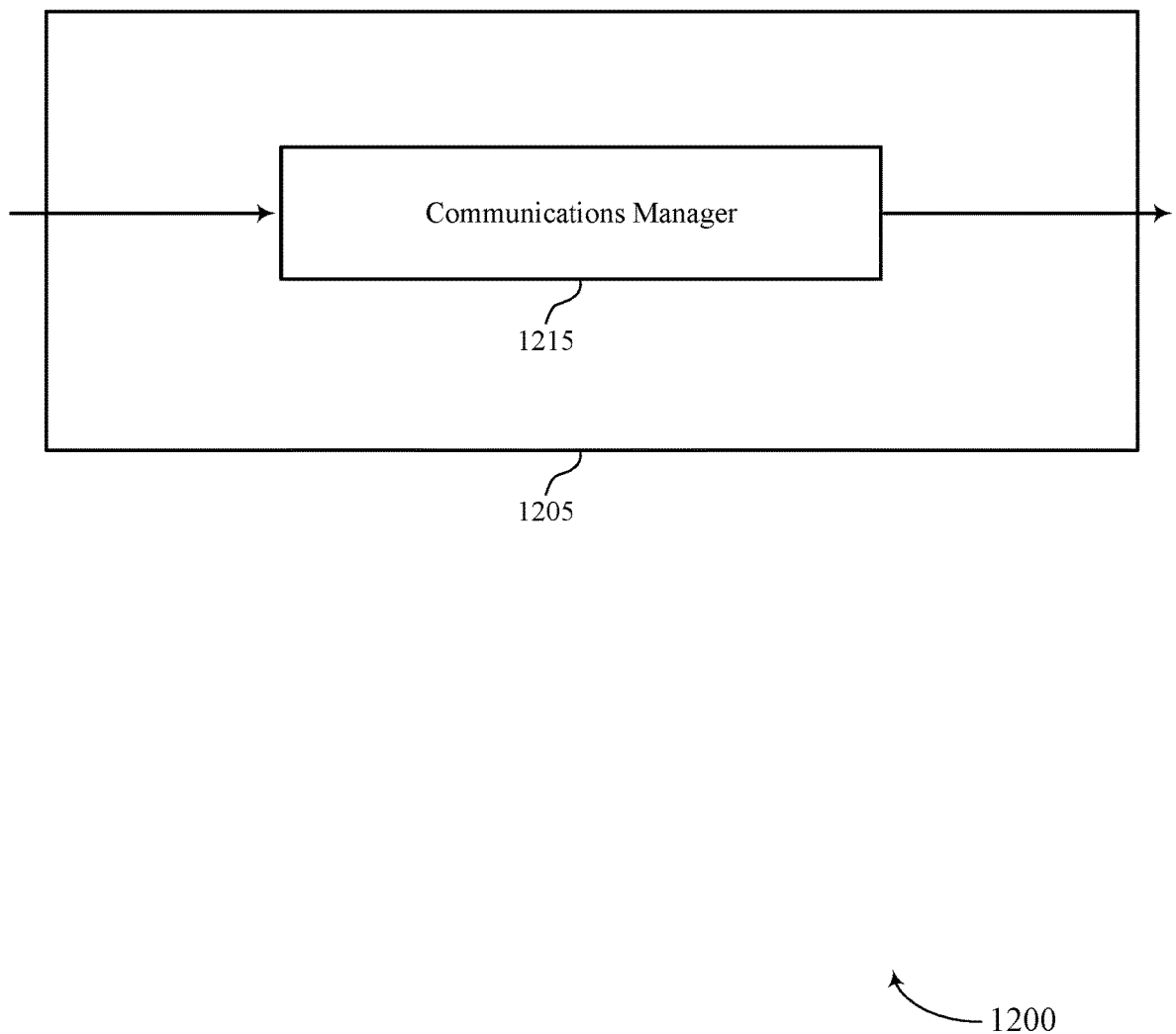
FIGS. 12 and 13 show block diagrams of devices that support techniques to use reference signals for intelligent reflecting surface systems in accordance with various aspects of the present disclosure.

FIG. 12 shows a block diagram 1200 of a device 1205 that supports techniques to use reference signals for intelligent reflecting surface systems in accordance with various aspects of the present disclosure. The device 1205 may be an example of aspects of an IRS device as described herein. The device 1205 may include a communications manager 1215. The device 1205 may also include a processor.

The communications manager 1215 may receive one or more reference signals from a base station in accordance with a reference signal configuration for communications between the base station and a UE, the reference signal configuration indicating a first set of parameters associated with one or more reflecting elements of the intelligent reflecting surface device, relay the one or more reference signals from the base station in accordance with the first set of parameters of the reference signal configuration, and relay communications between the base station and the UE in accordance with a second set of parameters associated with the one or more reflecting elements of the intelligent reflecting surface device based on relaying the one or more reference signals. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Figure 13:
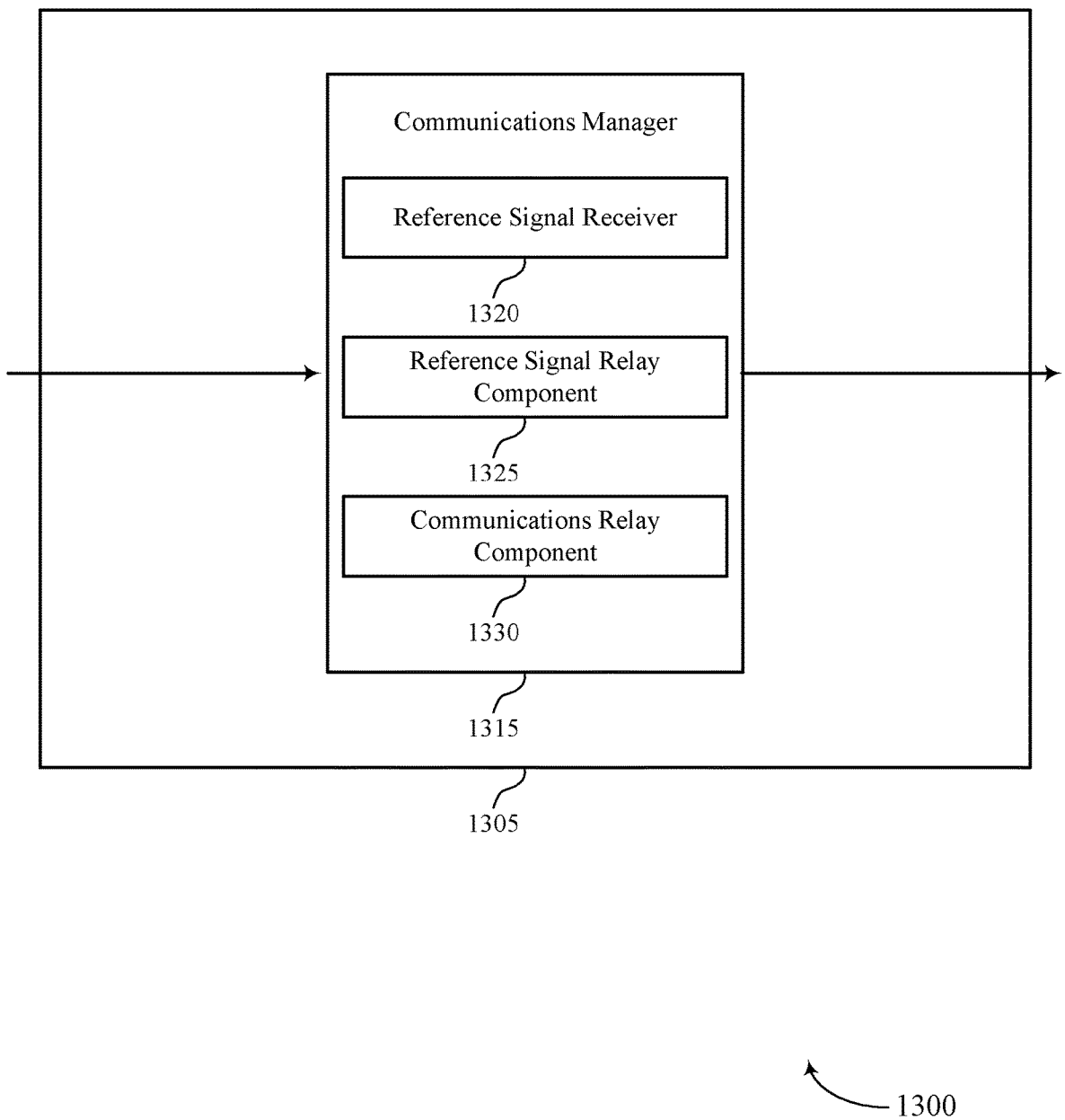

FIG. 13 shows a block diagram 1300 of a device 1305 that supports techniques to use reference signals for intelligent reflecting surface systems in accordance with various aspects of the present disclosure. The device 1305 may be an example of aspects of a device 1205 or an IRS device 220 as described herein. The device 1305 may include a communications manager 1315. The device 1305 may also include a processor. Each of these components may be in communication with one another (e.g., via one or more buses).

The communications manager 1315 may be an example of aspects of the communications manager 1215 as described herein. The communications manager 1315 may include a reference signal receiver 1320, a reference signal relay component 1325, and a communications relay component 1330. The communications manager 1315 may be an example of aspects of the communications manager 1510 described herein.

The reference signal receiver 1320 may receive one or more reference signals from a base station in accordance with a reference signal configuration for communications between the base station and a UE, the reference signal configuration indicating a first set of parameters associated with one or more reflecting elements of the intelligent reflecting surface device.

The reference signal relay component 1325 may relay the one or more reference signals from the base station in accordance with the first set of parameters of the reference signal configuration.

The communications relay component 1330 may relay communications between the base station and the UE in accordance with a second set of parameters associated with the one or more reflecting elements of the intelligent reflecting surface device based on relaying the one or more reference signals.

Figure 14:
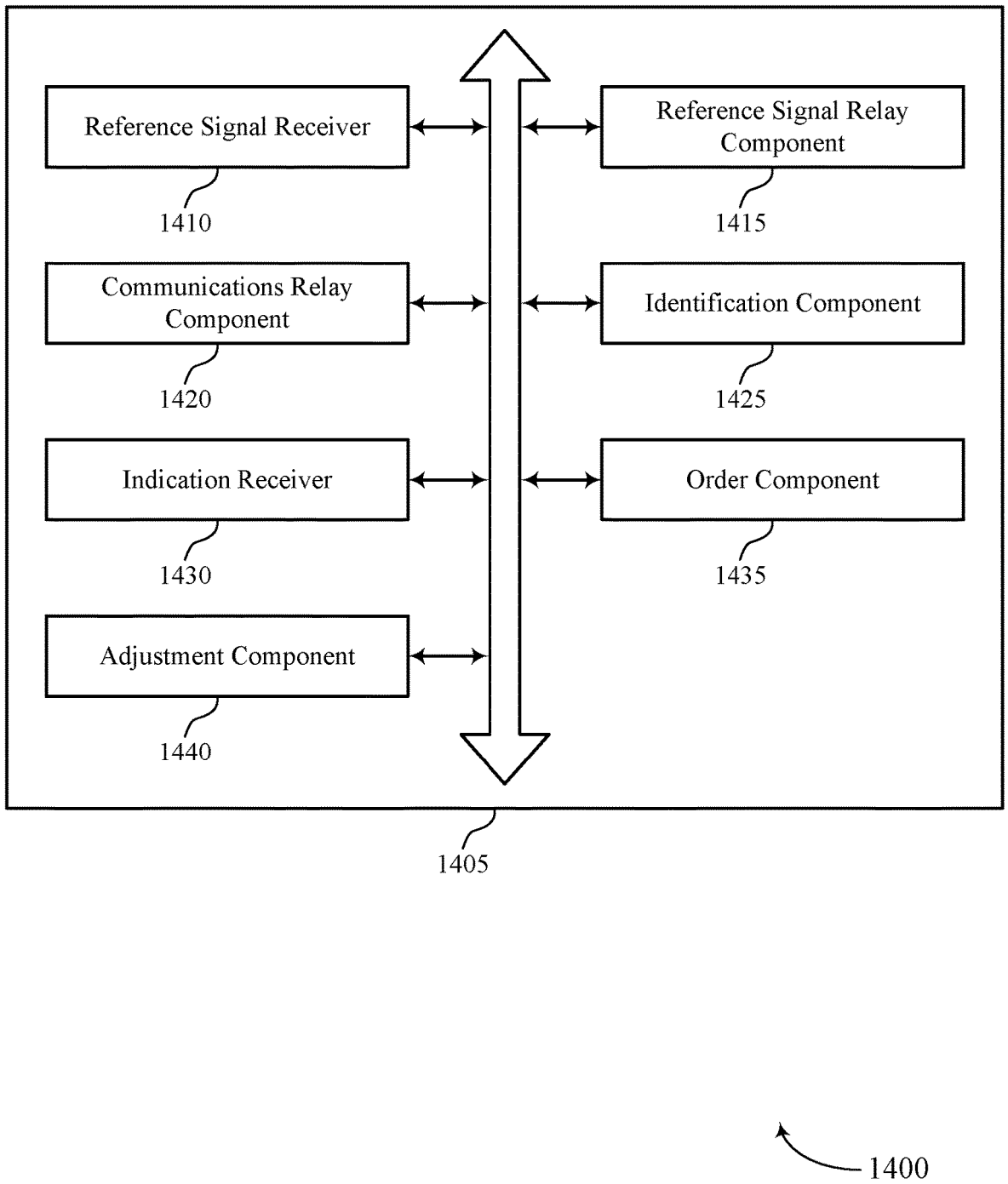
FIG. 14 shows a block diagram of a communications manager that supports techniques to use reference signals for intelligent reflecting surface systems in accordance with various aspects of the present disclosure.

FIG. 14 shows a block diagram 1400 of a communications manager 1405 that supports techniques to use reference signals for intelligent reflecting surface systems in accordance with various aspects of the present disclosure. The communications manager 1405 may be an example of aspects of a communications manager 1215, a communications manager 1315, or a communications manager 1510 described herein. The communications manager 1405 may include a reference signal receiver 1410, a reference signal relay component 1415, a communications relay component 1420, an identification component 1425, an indication receiver 1430, an order component 1435, and an adjustment component 1440. Each of these components may communicate, directly or indirectly, with one another (e.g., via one or more buses).

The reference signal receiver 1410 may receive one or more reference signals from a base station in accordance with a reference signal configuration for communications between the base station and a UE, the reference signal configuration indicating a first set of parameters associated with one or more reflecting elements of the intelligent reflecting surface device.

The reference signal relay component 1415 may relay the one or more reference signals from the base station in accordance with the first set of parameters of the reference signal configuration. In some examples, the reference signal relay component 1415 may identify a quantity of the one or more reference signals based on the reference signal configuration. In some examples, the reference signal relay component 1415 may identify a first portion of the quantity of the one or more reference signals and a second portion of the quantity of the one or more reference signals. In some cases, the first portion corresponds to a quantity of layers of multiple input multiple output communications and the second portion corresponds to a quantity of the one or more reflecting elements of the intelligent reflecting surface device. In some cases, the first portion includes a first set of reference signals associated with a first parameter of the second set of parameters, and where the second portion includes a second set of reference signals associated with the second set of parameters.

The communications relay component 1420 may relay communications between the base station and the UE in accordance with a second set of parameters associated with the one or more reflecting elements of the intelligent reflecting surface device based on relaying the one or more reference signals.

The identification component 1425 may identify the second set of parameters for relaying the communications between the base station and the UE.

The indication receiver 1430 may receive, from the base station, an indication of the second set of parameters, where identifying the second set of parameters is based on the received indication. In some examples, the indication receiver 1430 may receive, from the base station, an indication of the reference signal configuration.

The order component 1435 may identify a transmission order of the quantity of the one or more reference signals, where relaying the one or more reference signals includes relaying the one or more reference signals in accordance with the identified transmission order.

The adjustment component 1440 may adjust the one or more reflecting elements of the intelligent reflecting surface device in accordance with the second set of parameters, where relaying the communications includes relaying the communications using the adjusted one or more reflecting elements, where the communications include a multiple input multiple output data transmission.

Figure 15:
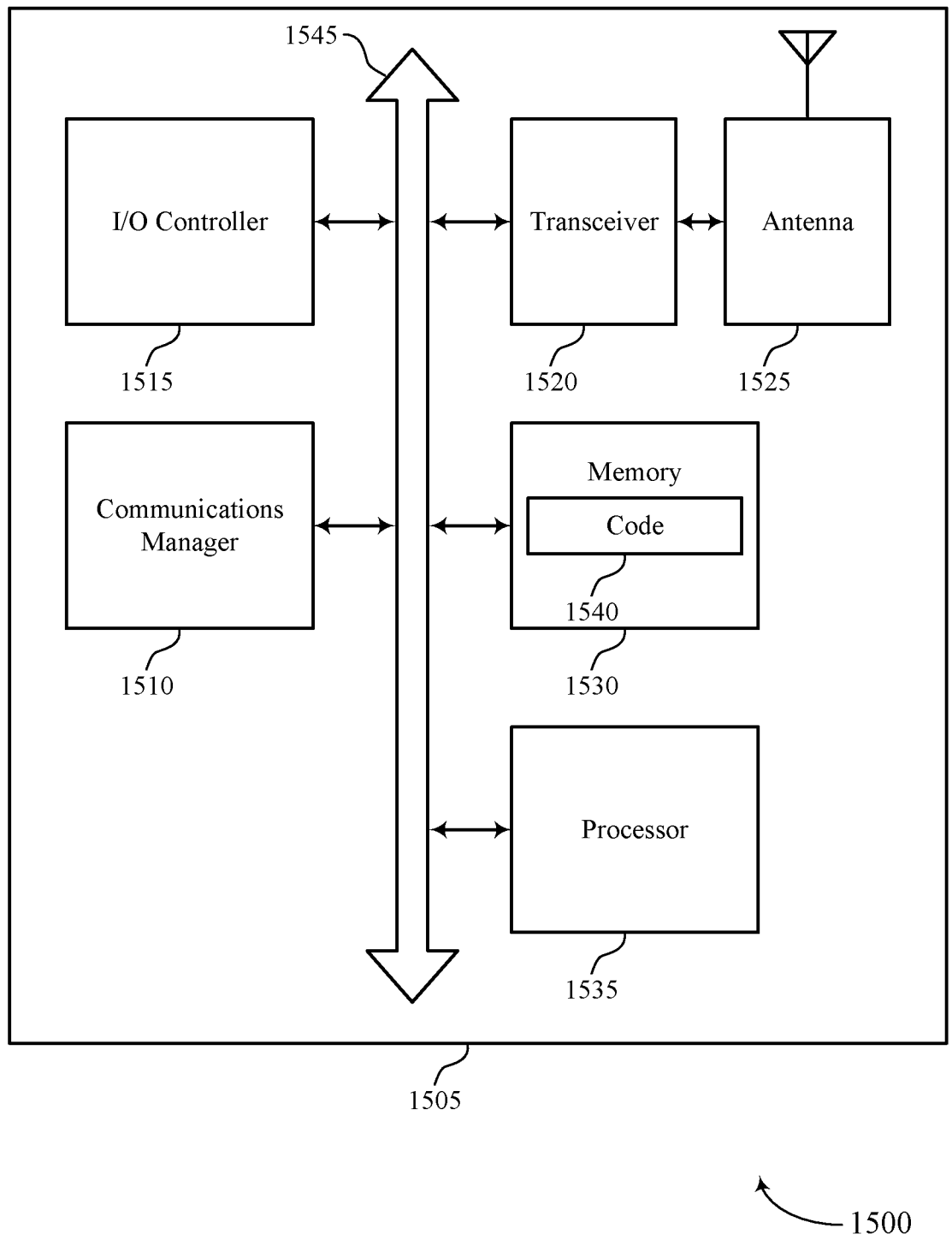
FIG. 15 shows a diagram of a system including a device that supports techniques to use reference signals for intelligent reflecting surface systems in accordance with various aspects of the present disclosure.

FIG. 15 shows a diagram of a system 1500 including a device 1505 that supports techniques to use reference signals for intelligent reflecting surface systems in accordance with various aspects of the present disclosure. The device 1505 may be an example of or include the components of device 1205, device 1305, or an IRS device as described herein. The device 1505 may include components for bi-directional voice and data communications including components for transmitting and receiving communications, including a communications manager 1510, an I/O controller 1515, a transceiver 1520, an antenna 1525, memory 1530, and a processor 1535. These components may be in electronic communication via one or more buses (e.g., bus 1545).

The communications manager 1510 may receive one or more reference signals from a base station in accordance with a reference signal configuration for communications between the base station and a UE, the reference signal configuration indicating a first set of parameters associated with one or more reflecting elements of the intelligent reflecting surface device, relay the one or more reference signals from the base station in accordance with the first set of parameters of the reference signal configuration, and relay communications between the base station and the UE in accordance with a second set of parameters associated with the one or more reflecting elements of the intelligent reflecting surface device based on relaying the one or more reference signals.

The I/O controller 1515 may manage input and output signals for the device 1505. The I/O controller 1515 may also manage peripherals not integrated into the device 1505. In some cases, the I/O controller 1515 may represent a physical connection or port to an external peripheral. In some cases, the I/O controller 1515 may utilize an operating system such as iOS®, ANDROID®, MS-DOS®, MS-WINDOWS®, OS/2®, UNIX®, LINUX®, or another known operating system. In other cases, the I/O controller 1515 may represent or interact with a modem, a keyboard, a mouse, a touchscreen, or a similar device. In some cases, the I/O controller 1515 may be implemented as part of a processor. In some cases, a user may interact with the device 1505 via the I/O controller 1515 or via hardware components controlled by the I/O controller 1515.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM and ROM. The memory 1530 may store computer-readable, computer-executable code 1540 including instructions that, when executed, cause the processor to perform various functions described herein. In some cases, the memory 1530 may contain, among other things, a BIOS which may control basic hardware or software operation such as the interaction with peripheral components or devices.

The processor 1535 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1535 may be configured to operate a memory array using a memory controller. In other cases, a memory controller may be integrated into the processor 1535. The processor 1535 may be configured to execute computer-readable instructions stored in a memory (e.g., the memory 1530) to cause the device 1505 to perform various functions (e.g., functions or tasks supporting techniques to use reference signals for intelligent reflecting surface systems).

The code 1540 may include instructions to implement aspects of the present disclosure, including instructions to support wireless communications. The code 1540 may be stored in a non-transitory computer-readable medium such as system memory or other type of memory. In some cases, the code 1540 may not be directly executable by the processor 1535 but may cause a computer (e.g., when compiled and executed) to perform functions described herein.

Figure 16:
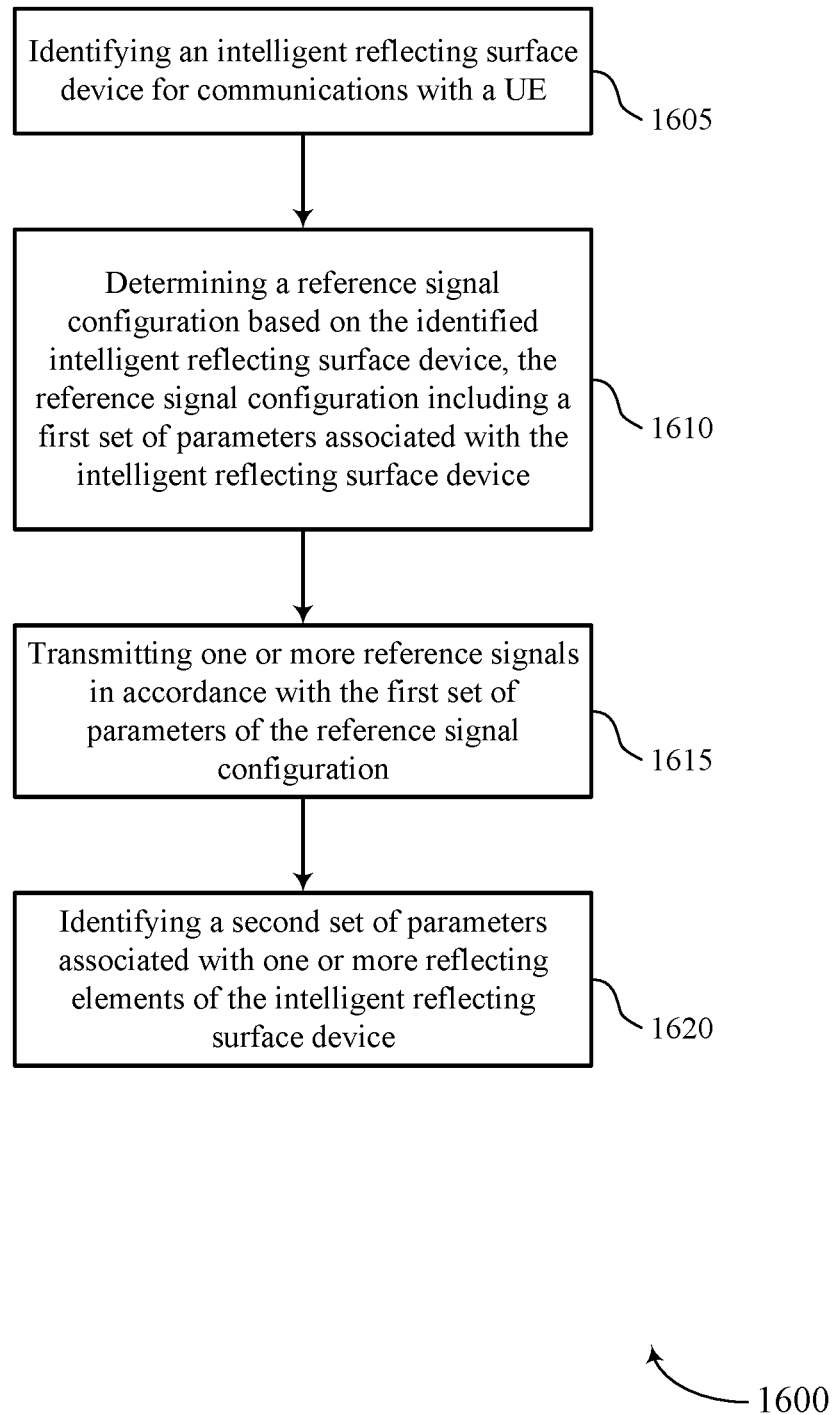
FIGS. 16 through 18 show flowcharts illustrating methods that support techniques to use reference signals for intelligent reflecting surface systems in accordance with various aspects of the present disclosure.

FIG. 16 shows a flowchart illustrating a method 1600 that supports techniques to use reference signals for intelligent reflecting surface systems in accordance with various aspects of the present disclosure. The operations of method 1600 may be implemented by a base station 105 or its components as described herein. For example, the operations of method 1600 may be performed by a communications manager as described with reference to FIGS. 8 through 11. In some examples, a base station may execute a set of instructions to control the functional elements of the base station to perform the functions described below. Additionally or alternatively, a base station may perform aspects of the functions described below using special-purpose hardware.

At 1605, the base station may identify an intelligent reflecting surface device for communications with a UE. The operations of 1605 may be performed according to the methods described herein. In some examples, aspects of the operations of 1605 may be performed by an IRS identifier as described with reference to FIGS. 8 through 11.

At 1610, the base station may determine a reference signal configuration based on the identified intelligent reflecting surface device, the reference signal configuration including a first set of parameters associated with the intelligent reflecting surface device. The operations of 1610 may be performed according to the methods described herein. In some examples, aspects of the operations of 1610 may be performed by a configuration component as described with reference to FIGS. 8 through 11.

At 1615, the base station may transmit one or more reference signals in accordance with the first set of parameters of the reference signal configuration. The operations of 1615 may be performed according to the methods described herein. In some examples, aspects of the operations of 1615 may be performed by a reference signal transmitter as described with reference to FIGS. 8 through 11.

At 1620, the base station may identify a second set of parameters associated with one or more reflecting elements of the intelligent reflecting surface device. The operations of 1620 may be performed according to the methods described herein. In some examples, aspects of the operations of 1620 may be performed by a parameter component as described with reference to FIGS. 8 through 11.

Figure 17:
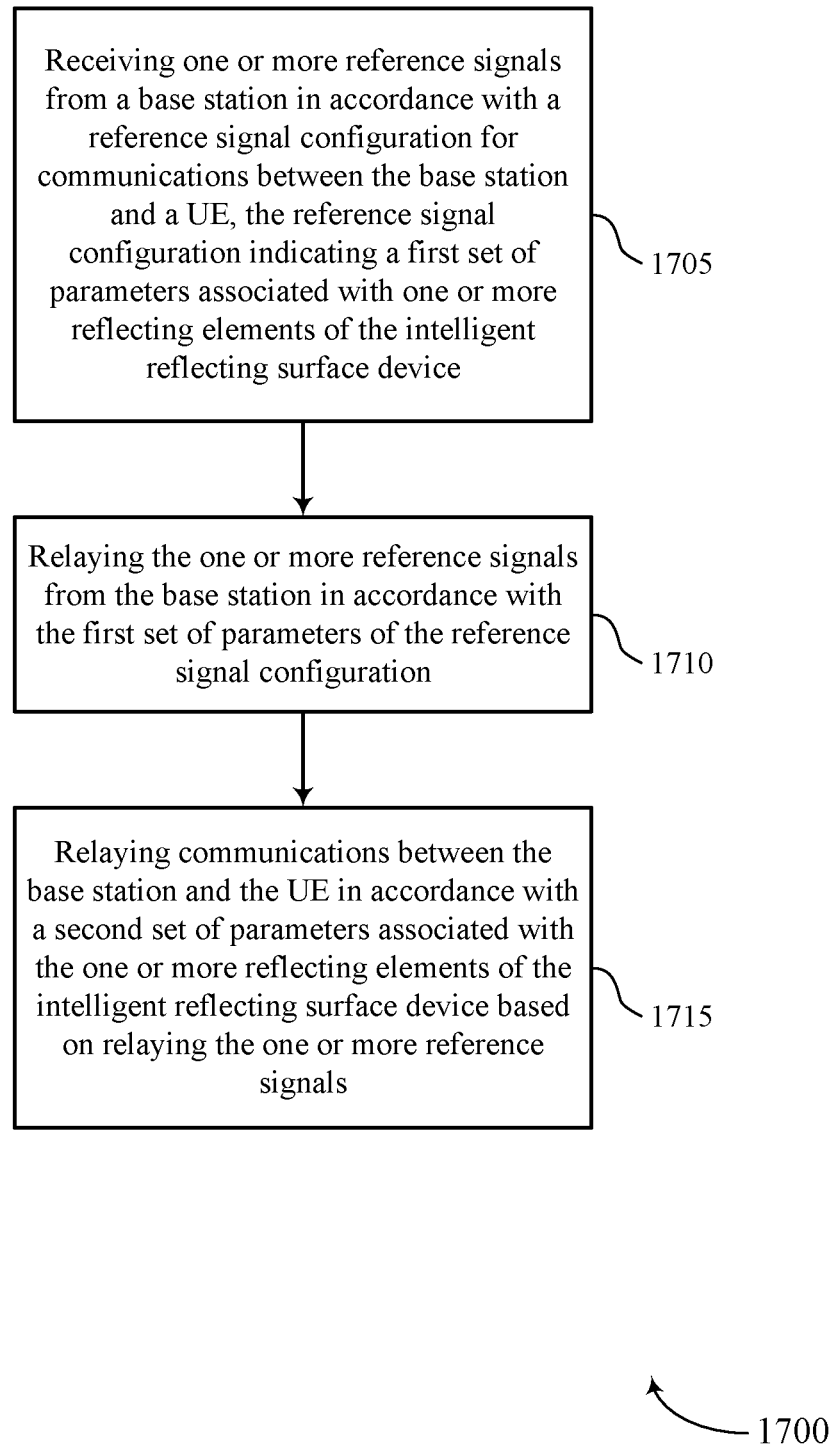

FIG. 17 shows a flowchart illustrating a method 1700 that supports techniques to use reference signals for intelligent reflecting surface systems in accordance with various aspects of the present disclosure. The operations of method 1700 may be implemented by an IRS device or its components as described herein. For example, the operations of method 1700 may be performed by a communications manager as described with reference to FIGS. 12 through 15. In some examples, an IRS device may execute a set of instructions to control the functional elements of the IRS device to perform the functions described below. Additionally or alternatively, an IRS device may perform aspects of the functions described below using special-purpose hardware.

At 1705, the IRS device may receive one or more reference signals from a base station in accordance with a reference signal configuration for communications between the base station and a UE, the reference signal configuration indicating a first set of parameters associated with one or more reflecting elements of the intelligent reflecting surface device. The operations of 1705 may be performed according to the methods described herein. In some examples, aspects of the operations of 1705 may be performed by a reference signal receiver as described with reference to FIGS. 12 through 15.

At 1710, the IRS device may relay the one or more reference signals from the base station in accordance with the first set of parameters of the reference signal configuration. The operations of 1710 may be performed according to the methods described herein. In some examples, aspects of the operations of 1710 may be performed by a reference signal relay component as described with reference to FIGS. 12 through 15.

At 1715, the IRS device may relay communications between the base station and the UE in accordance with a second set of parameters associated with the one or more reflecting elements of the intelligent reflecting surface device based on relaying the one or more reference signals. The operations of 1715 may be performed according to the methods described herein. In some examples, aspects of the operations of 1715 may be performed by a communications relay component as described with reference to FIGS. 12 through 15.

Figure 18:
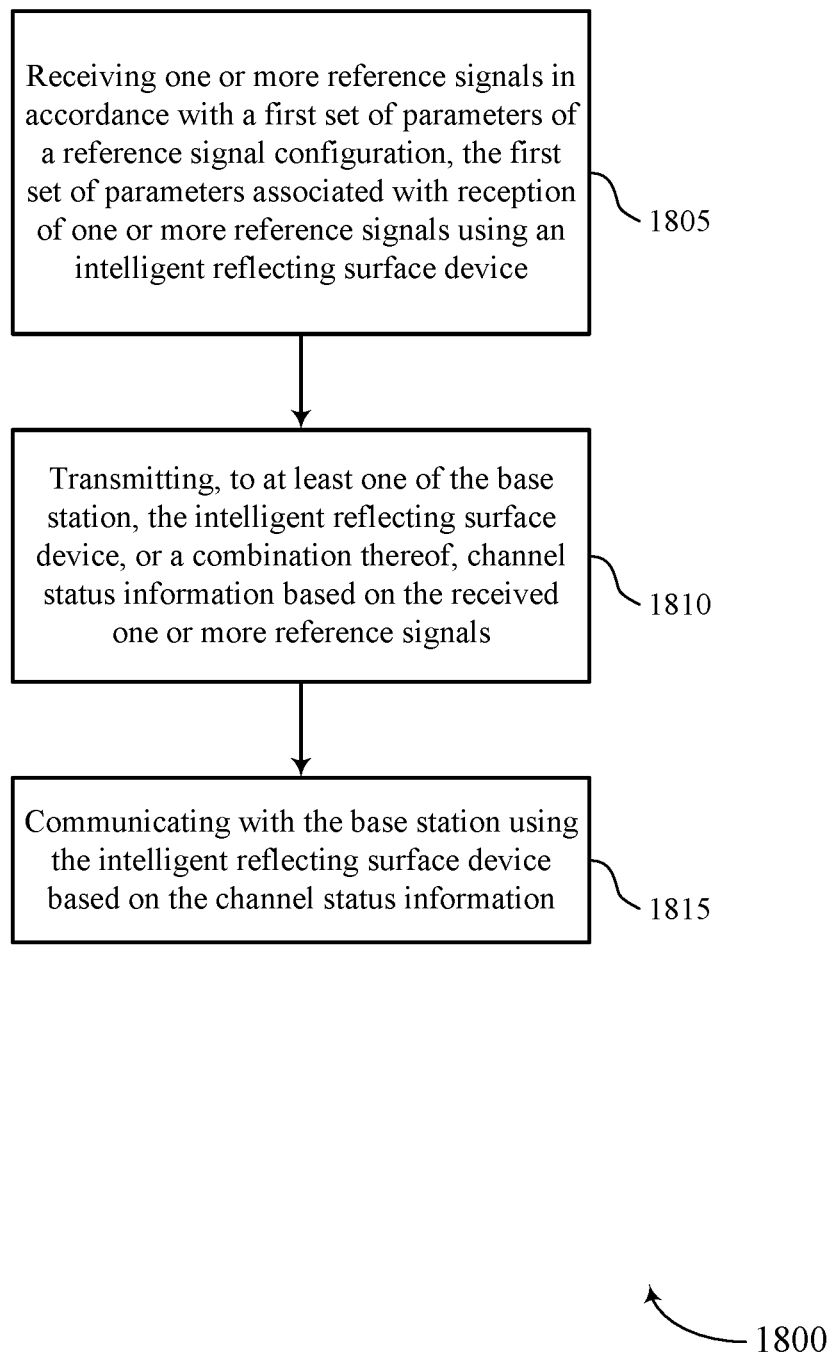

FIG. 18 shows a flowchart illustrating a method 1800 that supports techniques to use reference signals for intelligent reflecting surface systems in accordance with various aspects of the present disclosure. The operations of method 1800 may be implemented by a UE 115 or its components as described herein. For example, the operations of method 1800 may be performed by a communications manager as described with reference to FIGS. 4 through 7. In some examples, a UE may execute a set of instructions to control the functional elements of the UE to perform the functions described below. Additionally or alternatively, a UE may perform aspects of the functions described below using special-purpose hardware.

At 1805, the UE may receive one or more reference signals in accordance with a first set of parameters of a reference signal configuration, the first set of parameters associated with reception of one or more reference signals using an intelligent reflecting surface device. The operations of 1805 may be performed according to the methods described herein. In some examples, aspects of the operations of 1805 may be performed by a reference signal receiver as described with reference to FIGS. 4 through 7.

At 1810, the UE may transmit, to at least one of the base station, the intelligent reflecting surface device, or a combination thereof, channel status information based on the received one or more reference signals. The operations of 1810 may be performed according to the methods described herein. In some examples, aspects of the operations of 1810 may be performed by a CSI transmitter as described with reference to FIGS. 4 through 7.

At 1815, the UE may communicate with the base station using the intelligent reflecting surface device based on the channel status information. The operations of 1815 may be performed according to the methods described herein. In some examples, aspects of the operations of 1815 may be performed by a communicating component as described with reference to FIGS. 4 through 7.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a base station, comprising: identifying an intelligent reflecting surface device for communications with a UE; determining a reference signal configuration based at least in part on the identified intelligent reflecting surface device, the reference signal configuration including a first set of parameters associated with the intelligent reflecting surface device; transmitting one or more reference signals in accordance with the first set of parameters of the reference signal configuration; and identifying a second set of parameters associated with one or more reflecting elements of the intelligent reflecting surface device.

Aspect 2: The method of aspect 1, further comprising: identifying a quantity of the one or more reference signals based at least in part on the identified intelligent reflecting surface device.

Aspect 3: The method of aspect 2, further comprising: identifying a first portion of the quantity of the one or more reference signals and a second portion of the quantity of the one or more reference signals.

Aspect 4: The method of aspect 3, wherein the first portion corresponds to a quantity of layers of multiple input multiple output communications with the UE and the second portion corresponds to a quantity of the one or more reflecting elements of the intelligent reflecting surface device.

Aspect 5: The method of aspect 4, wherein the first portion comprises a first set of reference signals associated with a first parameter of the first set of parameters, and the second portion comprises a second set of reference signals associated with the first set of parameters.

Aspect 6: The method of any of aspects 2 through 5, further comprising: identifying a transmission order of the quantity of the one or more reference signals, wherein transmitting the one or more reference signals comprises: transmitting the one or more reference signals in accordance with the identified transmission order.

Aspect 7: The method of aspect 6, wherein the reference signal configuration indicates the transmission order.

Aspect 8: The method of any of aspects 1 through 7, further comprising: transmitting, to the intelligent reflecting surface device, an indication of the identified second set of parameters.

Aspect 9: The method of any of aspects 1 through 8, further comprising: receiving, from the UE, an indication of the intelligent reflecting surface device, wherein identifying the intelligent reflecting surface device is based at least in part on the received indication.

Aspect 10: The method of any of aspects 1 through 9, further comprising: receiving, from the UE in response to transmitting the one or more reference signals, feedback for the one or more reference signals; and estimating channel state information based on the received feedback.

Aspect 11: The method of aspect 10, wherein identifying the second set of parameters is based at least in part on the estimated channel state information.

Aspect 12: The method of any of aspects 1 through 11, further comprising: communicating with the UE using the intelligent reflecting surface device in accordance with the second set of parameters associated with the one or more reflecting elements and a third set of parameters associated with one or more antennas of the UE, wherein the communications comprise a multiple input multiple output data transmission.

Aspect 13: The method of any of aspects 1 through 12, further comprising: transmitting, to at least one of the UE, the intelligent reflecting surface device, or a combination thereof, the reference signal configuration.

Aspect 14: A method for wireless communications at an intelligent reflecting surface device, comprising: receiving one or more reference signals from a base station in accordance with a reference signal configuration for communications between the base station and a UE, the reference signal configuration indicating a first set of parameters associated with one or more reflecting elements of the intelligent reflecting surface device; relaying the one or more reference signals from the base station in accordance with the first set of parameters of the reference signal configuration; and relaying the communications between the base station and the UE in accordance with a second set of parameters associated with the one or more reflecting elements of the intelligent reflecting surface device based at least in part on relaying the one or more reference signals.

Aspect 15: The method of aspect 14, further comprising: identifying the second set of parameters for relaying the communications between the base station and the UE.

Aspect 16: The method of aspect 15, further comprising: receiving, from the base station, an indication of the second set of parameters, wherein identifying the second set of parameters is based at least in part on the received indication.

Aspect 17: The method of any of aspects 14 through 16, further comprising: identifying a quantity of the one or more reference signals based at least in part on the reference signal configuration.

Aspect 18: The method of aspect 17, further comprising: identifying a first portion of the quantity of the one or more reference signals and a second portion of the quantity of the one or more reference signals.

Aspect 19: The method of aspect 18, wherein the first portion corresponds to a quantity of layers of multiple input multiple output communications and the second portion corresponds to a quantity of the one or more reflecting elements of the intelligent reflecting surface device.

Aspect 20: The method of aspect 19, wherein the first portion comprises a first set of reference signals associated with a first parameter of the first set of parameters, and the second portion comprises a second set of reference signals associated with the first set of parameters.

Aspect 21: The method of any of aspects 18 through 20, further comprising: identifying a transmission order of the quantity of the one or more reference signals, wherein relaying the one or more reference signals comprises: relaying the one or more reference signals in accordance with the identified transmission order.

Aspect 22: The method of any of aspects 14 through 21, further comprising: adjusting the one or more reflecting elements of the intelligent reflecting surface device in accordance with the second set of parameters, wherein relaying the communications includes relaying the communications using the adjusted one or more reflecting elements, wherein the communications comprise a multiple input multiple output data transmission.

Aspect 23: The method of any of aspects 14 through 22, further comprising: receiving, from the base station, an indication of the reference signal configuration.

Aspect 24: A method for wireless communications at a UE, comprising: receiving one or more reference signals in accordance with a first set of parameters of a reference signal configuration, the first set of parameters associated with reception of one or more reference signals using an intelligent reflecting surface device; transmitting, to at least one of a base station, the intelligent reflecting surface device, or a combination thereof, channel status information based at least in part on the received one or more reference signals;

and communicating with the base station using the intelligent reflecting surface device based at least in part on the channel status information.

Aspect 25: The method of aspect 24, further comprising: identifying the intelligent reflecting surface device for communications with the base station; and transmitting an indication of the identified intelligent reflecting surface device to the base station.

Aspect 26: The method of any of aspects 24 through 25, further comprising: identifying a quantity of the one or more reference signals based at least in part on the received reference signal configuration.

Aspect 27: The method of aspect 26, further comprising: identifying a first portion of the quantity of the one or more reference signals and a second portion of the quantity of the one or more reference signals.

Aspect 28: The method of aspect 27, wherein the first portion corresponds to a quantity of layers of multiple input multiple output communications with the base station and the second portion corresponds to a quantity of one or more reflecting elements of the intelligent reflecting surface device.

Aspect 29: The method of aspect 28, wherein the first portion comprises a first set of reference signals associated with a first parameter of the first set of parameters, and the second portion comprises a second set of reference signals associated with the first set of parameters.

Aspect 30: The method of any of aspects 26 through 29, further comprising: identifying a transmission order of the quantity of the one or more reference signals, wherein receiving the one or more reference signals comprises: receiving the one or more reference signals in accordance with the identified transmission order.

Aspect 31: The method of any of aspects 24 through 30, wherein the communicating with the base station comprises receiving a multiple input multiple output data transmission.

Aspect 32: An apparatus for wireless communications at a base station, comprising a processor; memory coupled with the processor; and instructions stored in the memory and executable by the processor to cause the apparatus to perform a method of any of aspects 1 through 13.

Aspect 33: An apparatus for wireless communications at a base station, comprising at least one means for performing a method of any of aspects 1 through 13.

Aspect 34: A non-transitory computer-readable medium storing code for wireless communications at a base station, the code comprising instructions executable by a processor to perform a method of any of aspects 1 through 13.

Aspect 35: An apparatus for wireless communications at an intelligent reflecting surface device, comprising a processor; memory coupled with the processor; and instructions stored in the memory and executable by the processor to cause the apparatus to perform a method of any of aspects 14 through 23.

Aspect 36: An apparatus for wireless communications at an intelligent reflecting surface device, comprising at least one means for performing a method of any of aspects 14 through 23.

Aspect 37: A non-transitory computer-readable medium storing code for wireless communications at an intelligent reflecting surface device, the code comprising instructions executable by a processor to perform a method of any of aspects 14 through 23.

Aspect 38: An apparatus for wireless communications at a UE, comprising a processor; memory coupled with the processor; and instructions stored in the memory and executable by the processor to cause the apparatus to perform a method of any of aspects 24 through 31.

Aspect 39: An apparatus for wireless communications at a UE, comprising at least one means for performing a method of any of aspects 24 through 31.

Aspect 40: A non-transitory computer-readable medium storing code for wireless communications at a UE, the code comprising instructions executable by a processor to perform a method of any of aspects 24 through 31.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a network device, comprising:
   identifying an intelligent reflecting surface device for communications with a user equipment (UE);
   determining a reference signal configuration based at least in part on the identified intelligent reflecting surface device, the reference signal configuration including a first set of parameters associated with the intelligent reflecting surface device;
   transmitting one or more reference signals in accordance with the first set of parameters of the reference signal configuration; and
   identifying a second set of parameters associated with one or more reflecting elements of the intelligent reflecting surface device.

2. The method of claim 1, further comprising:
   identifying a quantity of the one or more reference signals based at least in part on the identified intelligent reflecting surface device.

3. The method of claim 2, further comprising:
   identifying a first portion of the quantity of the one or more reference signals and a second portion of the quantity of the one or more reference signals.

4. The method of claim 3, wherein the first portion corresponds to a quantity of layers of multiple input multiple output communications with the UE and the second portion corresponds to a quantity of the one or more reflecting elements of the intelligent reflecting surface device.

5. The method of claim 4, wherein the first portion comprises a first set of reference signals associated with a first parameter of the first set of parameters, and wherein the second portion comprises a second set of reference signals associated with the first set of parameters.

6. The method of claim 2, further comprising:
   identifying a transmission order of the quantity of the one or more reference signals, wherein transmitting the one or more reference signals comprises:
      transmitting the one or more reference signals in accordance with the identified transmission order.

7. The method of claim 6, wherein the reference signal configuration indicates the transmission order.

8. The method of claim 1, further comprising:
   transmitting, to the intelligent reflecting surface device, an indication of the identified second set of parameters.

9. The method of claim 1, further comprising:
   receiving, from the UE, an indication of the intelligent reflecting surface device, wherein identifying the intelligent reflecting surface device is based at least in part on the received indication.

10. The method of claim 1, further comprising:
    receiving, from the UE in response to transmitting the one or more reference signals, feedback for the one or more reference signals; and
    estimating channel state information based on the received feedback.

11. The method of claim 10, wherein:
    identifying the second set of parameters is based at least in part on the estimated channel state information.

12. The method of claim 1, further comprising:
    communicating with the UE using the intelligent reflecting surface device in accordance with the second set of parameters associated with the one or more reflecting elements and a third set of parameters associated with one or more antennas of the UE, wherein the communications comprise a multiple input multiple output data transmission.

13. The method of claim 1, further comprising:
transmitting, to at least one of the UE, the intelligent reflecting surface device, or a combination thereof, the reference signal configuration.

14. A method for wireless communications at an intelligent reflecting surface device, comprising:
receiving one or more reference signals from a network device in accordance with a reference signal configuration for communications between the network device and a user equipment (UE), the reference signal configuration indicating a first set of parameters associated with one or more reflecting elements of the intelligent reflecting surface device;
relaying the one or more reference signals from the network device in accordance with the first set of parameters of the reference signal configuration; and
relaying the communications between the network device and the UE in accordance with a second set of parameters associated with the one or more reflecting elements of the intelligent reflecting surface device based at least in part on relaying the one or more reference signals.

15. The method of claim 14, further comprising:
identifying the second set of parameters for relaying the communications between the network device and the UE.

16. The method of claim 15, further comprising:
receiving, from the network device, an indication of the second set of parameters, wherein identifying the second set of parameters is based at least in part on the received indication.

17. The method of claim 14, further comprising:
identifying a quantity of the one or more reference signals based at least in part on the reference signal configuration.

18. The method of claim 17, further comprising:
identifying a first portion of the quantity of the one or more reference signals and a second portion of the quantity of the one or more reference signals.

19. The method of claim 18, wherein the first portion corresponds to a quantity of layers of multiple input multiple output communications and the second portion corresponds to a quantity of the one or more reflecting elements of the intelligent reflecting surface device.

20. The method of claim 19, wherein the first portion comprises a first set of reference signals associated with a first parameter of the first set of parameters, and wherein the second portion comprises a second set of reference signals associated with the first set of parameters.

21. The method of claim 18, further comprising:
identifying a transmission order of the quantity of the one or more reference signals, wherein relaying the one or more reference signals comprises:
relaying the one or more reference signals in accordance with the identified transmission order.

22. The method of claim 14, further comprising:
adjusting the one or more reflecting elements of the intelligent reflecting surface device in accordance with the second set of parameters, wherein relaying the communications includes relaying the communications using the adjusted one or more reflecting elements, wherein the communications comprise a multiple input multiple output data transmission.

23. A method for wireless communications at a user equipment (UE), comprising:
receiving one or more reference signals in accordance with a first set of parameters of a reference signal configuration, the first set of parameters associated with reception of one or more reference signals using an intelligent reflecting surface device;
transmitting, to at least one of a network device, the intelligent reflecting surface device, or a combination thereof, channel status information based at least in part on the received one or more reference signals; and
communicating with the network device using the intelligent reflecting surface device based at least in part on the channel status information.

24. The method of claim 23, further comprising:
identifying the intelligent reflecting surface device for communications with the network device; and
transmitting an indication of the identified intelligent reflecting surface device to the network device.

25. The method of claim 23, further comprising:
identifying a quantity of the one or more reference signals based at least in part on the received reference signal configuration.

26. The method of claim 25, further comprising:
identifying a first portion of the quantity of the one or more reference signals and a second portion of the quantity of the one or more reference signals.

27. The method of claim 26, wherein the first portion corresponds to a quantity of layers of multiple input multiple output communications with the network device and the second portion corresponds to a quantity of one or more reflecting elements of the intelligent reflecting surface device.

28. The method of claim 26, wherein the first portion comprises a first set of reference signals associated with a first parameter of the first set of parameters, and wherein the second portion comprises a second set of reference signals associated with the first set of parameters.

29. The method of claim 25, further comprising:
identifying a transmission order of the quantity of the one or more reference signals, wherein receiving the one or more reference signals comprises:
receiving the one or more reference signals in accordance with the identified transmission order.

30. An apparatus for wireless communications at a network device, comprising:
a processor,
memory coupled with the processor; and
instructions stored in the memory and executable by the processor to cause the apparatus to:
identify an intelligent reflecting surface device for communications with a user equipment (UE);
determine a reference signal configuration based at least in part on the identified intelligent reflecting surface device, the reference signal configuration including a first set of parameters associated with the intelligent reflecting surface device;
transmit one or more reference signals in accordance with the first set of parameters of the reference signal configuration; and
identify a second set of parameters associated with one or more reflecting elements of the intelligent reflecting surface device.

* * * * *